(12) United States Patent
Gagnon et al.

(10) Patent No.: US 10,093,419 B2
(45) Date of Patent: Oct. 9, 2018

(54) METHOD, SYSTEM, AND EXECUTABLE PROGRAM PRODUCT FOR CONTROLLING PASSENGER SERVICES

(71) Applicant: BOMBARDIER INC., Dorval (CA)

(72) Inventors: Pierre Gagnon, Vaudreuil (CA); Joseph Rezile, Terrebonne (CA); Marc Kirmoyan, Westmount (CA); Brad Nolen, Montreal (CA); Julien Fabrice Lacheré, Montreal (CA); Jeffrey David Karceski, Washington, DC (US)

(73) Assignee: BOMBARDIER INC., Dorval, QC (CA)

( * ) Notice: Subject to any disclaimer, the term of this patent is extended or adjusted under 35 U.S.C. 154(b) by 82 days.

(21) Appl. No.: 15/120,532

(22) PCT Filed: Feb. 20, 2015

(86) PCT No.: PCT/US2015/016789
§ 371 (c)(1),
(2) Date: Aug. 22, 2016

(87) PCT Pub. No.: WO2015/130567
PCT Pub. Date: Sep. 3, 2015

(65) Prior Publication Data
US 2017/0073073 A1 Mar. 16, 2017

Related U.S. Application Data

(60) Provisional application No. 61/946,200, filed on Feb. 28, 2014.

(51) Int. Cl.
*B64D 11/00* (2006.01)
*H05B 37/02* (2006.01)
(Continued)

(52) U.S. Cl.
CPC ............... *B64D 11/00* (2013.01); *B60Q 3/44* (2017.02); *B60Q 3/47* (2017.02); *B60Q 3/76* (2017.02);
(Continued)

(58) Field of Classification Search
CPC .. B64D 11/00; B64D 13/06; B64D 2013/003; B64D 2013/0655; B64D 2011/0053;
(Continued)

(56) References Cited

U.S. PATENT DOCUMENTS 6,614,126 B1    9/2003   Mitchell
8,035,320 B2   10/2011   Sibert
(Continued)

FOREIGN PATENT DOCUMENTS

CN     101005973 A    7/2007
CN     101028804 A    9/2007
(Continued)

OTHER PUBLICATIONS

International Search Report and Written Opinion with regard to PCT/US2015/016789 dated Jun. 2, 2016.
(Continued)

*Primary Examiner* — Mussa A Shaawat
*Assistant Examiner* — Michael V Kerrigan
(74) *Attorney, Agent, or Firm* — BCF LLP

(57) ABSTRACT

A passenger service system includes a seat, a first sensor associated with the seat that senses a position of the seat and generates a first signal, a second sensor associated with the seat that senses the presence of a passenger in the seat and generates a second signal, a first light source disposed at a predetermined location with respect to the seat, where the first light source generates light, a third sensor associated with the first light source that senses at least a position of at least one hand of the passenger and generate a third signal,
(Continued)

and a controller that receives the first signal, a first light signal that controls at least one parameter associated with the light including at least one of an intensity, a color, a projected pattern, projected pattern location, or a width.

23 Claims, 20 Drawing Sheets

(51) Int. Cl.
*B60Q 3/82* (2017.01)
*B60Q 3/44* (2017.01)
*B60Q 3/47* (2017.01)
*B60Q 3/76* (2017.01)
*B60Q 3/80* (2017.01)
*B64D 13/06* (2006.01)
*G05D 7/06* (2006.01)
*G05D 25/02* (2006.01)
*H05B 33/08* (2006.01)
*B64D 13/00* (2006.01)

(52) U.S. Cl.
CPC ............. *B60Q 3/80* (2017.02); *B60Q 3/82* (2017.02); *B64D 13/06* (2013.01); *G05D 7/0629* (2013.01); *G05D 25/02* (2013.01); *H05B 33/0842* (2013.01); *H05B 37/0227* (2013.01); *B64D 2011/0053* (2013.01); *B64D 2013/003* (2013.01); *B64D 2013/0655* (2013.01)

(58) Field of Classification Search
CPC .. G05D 25/02; G05D 7/0629; H05B 33/0842; H05B 37/0227; B60Q 3/82; B60Q 3/44; B60Q 3/76; B60Q 3/47; B60Q 3/80
See application file for complete search history.

(56) References Cited

U.S. PATENT DOCUMENTS

| | | | |
|---|---|---|---|
| 8,100,552 B2 | 1/2012 | Spero | |
| 8,348,455 B2 | 1/2013 | Kessler | |
| 8,556,478 B2 | 10/2013 | Riedel et al. | |
| 8,558,465 B2 | 10/2013 | Van Endert et al. | |
| 9,342,797 B2 | 5/2016 | El Dokor et al. | |
| 2005/0281030 A1 | 12/2005 | Leong et al. | |
| 2006/0044800 A1 | 3/2006 | Reime | |
| 2006/0261970 A1* | 11/2006 | Colacecchi ............ | B64D 11/00 340/686.1 |
| 2008/0065291 A1 | 3/2008 | Breed | |
| 2009/0109036 A1* | 4/2009 | Schalla ............ | B64D 11/0015 340/573.1 |
| 2011/0068227 A1 | 3/2011 | Kneller et al. | |
| 2011/0235350 A1 | 9/2011 | Kessler | |
| 2012/0018827 A1 | 1/2012 | Kestelli et al. | |
| 2012/0019891 A1 | 1/2012 | Dewell | |
| 2012/0223646 A1 | 9/2012 | Recker et al. | |
| 2013/0027954 A1 | 1/2013 | Boomgarden et al. | |
| 2013/0161971 A1 | 6/2013 | Bugno et al. | |
| 2013/0293722 A1 | 11/2013 | Chen | |

FOREIGN PATENT DOCUMENTS

| | | |
|---|---|---|
| CN | 202587538 U | 12/2012 |
| CN | 103282235 A | 9/2013 |
| DE | 102005045436 A1 | 3/2007 |
| DE | 102006027549 A1 | 12/2007 |
| DE | 102012015039 A1 | 1/2014 |
| FR | 2921603 A1 | 4/2009 |
| JP | 2011037386 A | 2/2011 |
| KR | 20130016660 A | 2/2013 |
| WO | 03016110 A2 | 2/2003 |
| WO | 2009063148 A1 | 5/2009 |

OTHER PUBLICATIONS

International Search Report and Written Opinion with regard to PCT/US2015/016912 dated Jun. 2, 2016.
International Search Report and Written Opinion with regard to PCT/US2015/016917 dated Jun. 2, 2016.
Official Action with regard to the Chinese Patent Application No. 201580014128.6 issued by the Chinese Patent Office dated Jun. 12, 2017.
English Abstract of CN103282235 retrieved on Espacenet on Jun. 20, 2017.
English Description for FR2921603 received from USPTO with regard to the Office Action for U.S. Appl. No. 15/120,534.
English Abstract for FR2921603 retrieved on Espacenet on Sep. 27, 2017.
Official Action with regard to the Chinese Patent Application No. 201580010397.5 (counterpart of a related application) issued by the Chinese Patent Office dated Mar. 28, 2017.
English Abstract of CN101005973 retrieved on Espacenet on May 1, 2017.
Official Action with regard to the Chinese Patent Application No. 201580014251.8 (counterpart application) issued by the Chinese Patent Office dated Apr. 6, 2017.
English Abstract of CN101028804 retrieved on Espacenet on May 29, 2017.
Communication pursuant to Article 94(3) EPS with regard to the European counterpart application No. 15708402.1 dated Jan. 30, 2018.
English Abstract for DE 102005045436 retrieved on Espacenet on Feb. 9, 2018.

* cited by examiner

METHOD, SYSTEM, AND EXECUTABLE PROGRAM PRODUCT FOR CONTROLLING PASSENGER SERVICES

CROSS-REFERENCE TO RELATED APPLICATION(S)

This International Patent Application claims priority to U.S. Provisional Patent Application Ser. No. 61/946,200, filed Feb. 28, 2014.

FIELD OF THE INVENTION

The present invention concerns an apparatus, method, and system for providing and controlling passenger services, such as overhead lighting units in the cabin of a vehicle. More specifically, the present invention concerns an apparatus, method, and system for providing and controlling overhead lighting units, and other comfort features, in the vehicle cabin.

DESCRIPTION OF THE RELATED ART

As should be apparent to any air traveler, overhead lighting is standard in any aircraft. In passenger aircraft, the overhead light (also referred to as a "reading light") may be actuated by pressing an on-off switch near to the overhead light. In still another well-known example, the passenger may activate the overhead light via an on-off switch, such as a switch on an armrest of the seat in which the passenger is sitting, on a side ledge between the seat and the fuselage of the aircraft, on a remote control device, etc.

Control over the direction of the light beam generated by the overhead light typically is provided via manipulation of a bezel surrounding the light fixture.

While the foregoing provides a brief overview of the types of overhead lighting that are common in aircraft and other vehicles, the prior art includes additional examples, some of which are summarized below.

U.S. Patent Application Publication No. 2013/0293722 (hereinafter "the '722 Publication") describes a light control system and method with a beam steering mechanism that directs a beam of light based on particular hand gestures that are detected by the system. (The '722 Publication at paragraph [0004].) The system permits adjustment of the brightness of the beam generated by the LED light source. (The '722 Publication at paragraph [0006].) In one embodiment, the system generates a control spot of light, senses hand gestures within that control spot, and moves the illumination region based on the hand gesture(s). (The '722 Publication at paragraph [0011].)

U.S. Patent Application Publication No. 2013/0120238 (hereinafter "the '238 Publication") describes a light control method and lighting device where a user may control the lighting device using gestures in three-dimensional space. (The '238 Publication at paragraph [0005].) In particular, gestural control is provided via an infrared projector 111 and a video sensor 112 with gestural motion and position software like that used by the Microsoft™ Kinect™ gaming device. (The '238 Publication at paragraph [0017].)

U.S. Pat. No. 8,288,968 (hereinafter "the '968 Patent") describes a lighting system with multiple light units with overlapping light beams. Because the system includes fixtures with multiple lights units (LEDs), the direction of the light beam may be changed without altering the physical location of the lighting unit. (The '968 Patent at col. 2, lines 10-13.) The light fixture includes an ultrasonic transmitter that permits the device to detect hand gestures in three dimensions with respect to the light fixture. (The '968 Patent at col. 2, lines 53-61.) Based on the hand gestures, parameters of the light, such as intensity and direction, may be varied. (The '968 Patent at col. 2, lines 28-40.)

U.S. Patent Application Publication No. 2010/0253241 (hereinafter "the '241 Publication") describes a lighting system with a lamp having an array of LEDs able to produce light with properties of intensity, color, and color temperature. The lighting system includes an ultrasonic transmitter and detector to detect ultrasonic signals in a direction of the light beam generated by the lamp. (The '241 Publication at paragraph [0014].) The light beam is intuitively controlled by moving one's hands within the light beam, the person's hand being detected via the ultrasonic signals. (The '241 Publication at paragraph [0015].)

U.S. Patent Application Publication No. 2012/0223646 (hereinafter "the '646 Publication") describes a system for controlling a wireless lighting module using radio frequency signals from a remote control, a sensor, a differing wireless lighting module, a radio frequency identification ("RFID") tag, and so forth. (The '646 Publication at the Abstract.) The input may be used to turn the lights on or off, change the intensity or color of the illumination, modulate illumination, alter the direction of the illumination, etc. (The '646 Publication at paragraph [0008].)

U.S. Patent Application Publication No. 2013/0027954 (hereinafter "the '954 Publication") describes a reading light unit for a passenger aircraft. The '954 Publication describes that control over the light beam includes geometrical properties of the light beam as well as optical properties of the light. (The '954 Publication at paragraph [0009].) Properties of the light that may be adjusted include light beam direction, focus, and width as well as light temperature (i.e., color) and intensity. (The '954 Publication at paragraphs [0010]-[0011].) A man-machine interface, such as a touch pad, may be used to control light beam geometrical properties and/or light beam optical properties. (The '954 Publication at paragraph [0014].)

U.S. Pat. No. 8,348,455 (hereinafter "the '455 Patent") describes an overhead reading light for a passenger seat in an aircraft. The overhead reading light includes multiple LEDs that, when arranged along a curved surface, may be activated selectively by the passenger to change the location of the illumination without mechanical manipulation of the light fixture. (The '455 Patent at col. 2, lines 10-24.) The light fixture may activate one or more of the individual light sources in response to the position of the passenger's seat. (The '455 Patent at col. 3, lines 58-67.)

U.S. Pat. No. 8,556,478 (hereinafter "the '478 Patent") describes an illumination device for several persons in an aircraft. The illumination device is designed to project different lighting patterns, including images, as directed. (The '478 Patent at col. 2, lines 26-31.) Lighting also may be controlled based on scenarios, such as eating, sleeping, reading, in an emergency, etc. (The '478 Patent at col. 2, lines 41-46.)

U.S. Patent Application Publication No. 2013/0147373 (hereinafter "the '373 Publication") describes an aircraft wash lighting system using LEDs. The lighting system includes modules or groups of LEDs that may be addressable in different lighting regions 20, including broad areas, within an aircraft. (The '373 Publication at paragraph [0020].)

U.S. Pat. No. 8,035,320 (hereinafter "the '320 Patent") describes a control network for illumination in a building, for example, where control over the network is influenced by inputs concerning ambient lighting levels, ambient motion, ambient sound, and electrical parameters of the illuminator. (The '320 Patent at col. 2, lines 57-60.) Motion and/or voice commands may be used to control parameters including illumination intensity and/or color. (The '320 Patent at col. 2, lines 60-67.)

Based on the information provided in the English abstract, Korean Patent Publication No. KR 20120138126 describes an apparatus controlling a digital device using a camera to detect an image of a person's hand and movement of the person's hand.

United Kingdom Patent No. GB 2500469 describes an aircraft interior lighting system that uses an LED light source coupled with a collimator lens and a micro lens array. The structure of the light source permits focus and projection of light within the cabin of an aircraft. The lighting system may be used for general interior illumination, as a reading light, or for illumination of artwork.

Using the English abstract as a guide, Korean Patent Publication No. KR 101275498 describes a lamp using an LED light source that is connected to a camera. The light is turned on or off based on information from the camera.

With reference to its English abstract, German Patent Publication No. DE 102011103639 describes a lamp with a controller that is operated to change the light intensities of several LEDs so that the locus of the colored light rays is retained. The lamp may be used in an aircraft cabin.

According to the English abstract, Chinese Patent Publication No. CN 102413614 provides for control over a lamp with a light emitting diode ("LED") functioning as the light source. Control over the lamp is made possible by a camera that, when connected to the lamp, receives gestural information. The lamp responds to gesture information corresponding to lighting instructions.

Chinese Patent Publication No. CN 102801409, at least according to its English abstract, describes an intelligent switch with a radio frequency transceiver, a capacitive touch control circuit, and a gesture recognition circuit, among other components. The on-off switch responds to gestural controls, such as pressure from a person's finger on the capacitive touch control circuit. The radio frequency transceiver transmits the person's instructions (i.e., on or off) to the light source in response to the gestural input.

With reference to the English abstract, Chinese Patent Publication No. 202587538 describes a LED light source that includes a gesture acquisition module. The gesture module recognizes gesture motion in an acquisition area, which forms the basis for a control signal for the LED light source.

According to its English abstract, Chinese Patent Publication No. 201162985 describes an intelligent LED illuminating lamp with a plurality of LEDs, sound control, gesture control, touch control, or a communication cell.

With reference to the English abstract, Chinese Patent Publication No. 202813161 describes a replacement lamp for an aircraft cabin, where the light source is an LED colored lamp.

As indicated by the English abstract, Chinese Patent Publication No. 202993086 describes a voice controlled rotating LED lamp. The LED is capable of rotating on a rotating seat, to provide illumination in the direction required.

According to its abstract, Chinese Patent Publication No. CN 102413620 describes an acousto-optic interactive motion adjusting LED intelligent light source. In particular, the reference describes a control system for the light source that includes a voice module that receives and processes vocal inputs. The light source stimulates the human nervous system simultaneously through an LED light source color signal and a voice signal to achieve a better effect of adjusting human emotion.

As noted above, while several lighting apparatuses and systems are known, there remains a desire for a simple, cost effective lighting and control system for overhead lighting in the cabin of a vehicle, such as an aircraft.

In connection with the overhead lighting associated with individual passenger seats, aircraft also include cabin lighting, which provides general lighting for all of the passengers. Cabin lighting is not controlled or influenced by passengers, as a general rule.

Aircraft cabins also typically include several windows. The window shades typically are opened or closed manually by passengers seated adjacent thereto.

Finally, aircraft cabins also typically include air nozzles to direct air flow as desired by the passengers.

There are no prior art systems that combine controls over two or more of comfort features including overhead lighting, cabin lighting, the degree of openness of window shades, the direction of the air nozzles within the aircraft cabin, and the flow rate through the air nozzles.

SUMMARY OF THE INVENTION

The present invention addresses one or more of the deficiencies noted with respect to the prior art.

In particular, the present invention provides for a passenger service system that includes a seat, a first sensor associated with the seat, where the first sensor senses a position of the seat and generates a first signal representative of the position of the seat, and a second sensor associated with the seat, where the second sensor is adapted to sense the presence of a passenger in the seat and generates a second signal representative of the presence of the passenger in the seat. The system also includes a first light source disposed at a predetermined location with respect to the seat, where the first light source generates light, a third sensor associated with the first light source, where the third sensor is adapted to sense at least a position of at least one hand of the passenger and generate a third signal representative of the at least one hand of the passenger, and a controller operatively connected to the first sensor, the second sensor, and the third sensor to receive the first signal, the second signal, and the third signal and generate a first light signal, to be received by the first light source, where the first light signal controls at least one parameter associated with the light including at least one of an intensity, a color, a projected pattern, projected pattern location, or a width.

The system of the present invention also may be constructed to include a passenger input device that generates a passenger input signal from the passenger as to the at least one parameter. The controller controls the at least one parameter based on the passenger input signal.

In the system of the present invention, it is contemplated that the second sensor is adapted to sense a weight of the passenger in the seat.

In addition, it is contemplated that the third sensor may be adapted to sense at least one of an orientation of the at least one hand of the passenger and a direction of movement of the at least one hand of the passenger.

The system of the present invention also may be constructed to include a fourth sensor associated with a window shade. The fourth sensor senses a degree of openness of the window shade and generates a fourth input signal. The controller is operatively connected to the fourth sensor to receive the fourth input signal. The controller further controls at least one parameter associated with the degree of openness of the window shade also based on the fourth input signal.

The system of the present invention also may be constructed to include a fifth sensor associated with a cabin light, where wherein the fifth sensor senses the cabin light and generates a fifth input signal. The controller is operatively connected to the fifth sensor to receive the fifth input signal. The controller further controls at least one parameter associated with the cabin light also based on the fifth input signal.

In another contemplated embodiment, the system of the present invention may be constructed to include a sixth sensor associated with an ambient light, where the sixth sensor senses the ambient light and generates a sixth input signal. If so, the controller is operatively connected to the sixth sensor to receive the sixth input signal. Moreover, the controller further controls at least one parameter associated with the ambient light also based on the sixth input signal.

In still one further contemplated embodiment, the passenger service system of the present invention includes a seventh sensor associated with an air supply, where the seventh sensor senses at least one of an air flow direction and an air flow rate and generates a seventh input signal. In this embodiment, the controller is operatively connected to the seventh sensor to receive the seventh input signal and the controller further controls at least one parameter associated with the at least one of an air flow direction and an air flow rate also based on the seventh input signal.

It is contemplated that the air supply may include an air nozzle.

In addition, it is contemplated that the first light source may include at least one light emitting diode.

According to one contemplated embodiment, the passenger service system of the present invention may include a second light source disposed at a predetermined location with respect to the seat. If so, the second light source is expected to generate light and the controller is contemplated to generate a second light signal, to be received by the second light source. The second light signal may control at least one parameter associated with the light including at least one of an intensity, a color, a projected pattern, projected pattern location, or a width.

Where a second light source is included in the passenger service system of the present invention, the second light source may include at least one light emitting diode.

Where the passenger service system of the present invention includes first and second light sources, the first light signal is the same as the second light signal.

In the embodiment where the passenger service system includes first and second light sources, the controller may balance the first light signal and the second light signal with respect to one another, thereby providing proportional control over the first light source and the second light source.

The present invention also provides a method of operation of a passenger service system. The method includes receiving, by a controller, a first input signal from a first sensor, where the first input signal concerns at least a position of a seat adapted to receive a passenger therein, receiving, by the controller, a second input signal from a second sensor, where the second input signal concerns at least a presence of the passenger in the seat, and receiving, by the controller, a third input signal from a third sensor, where the third input signal concerns at least one of a position, orientation, and directional motion of at least one hand of the passenger. In addition, the method includes adjusting, by the controller, at least one parameter associated with light generated by a first light source based on the first input signal, the second input signal, and the third input signal.

In one contemplated embodiment, the method further includes receiving a passenger input signal from a passenger input device associated with the seat, where the passenger input corresponds to the at least one parameter associated with the light and adjusting, by the controller, the at least one parameter associated with the light based on the passenger input signal.

It is contemplated that the second sensor may be adapted to sense a weight of the passenger in the seat.

It is contemplated that the first light source may include at least one light emitting diode.

In another contemplated embodiment, the method may include receiving, by the controller, a fourth input signal from a fourth sensor associated with a window shade, where the fourth input signal concerns a degree of openness of the window shade, receiving, by the controller, a fifth input signal from a fifth sensor associated with a cabin light, where the fifth input signal concerns a parameter associated with the cabin light, receiving, by the controller, a sixth input signal from a sixth sensor associated with an ambient light, where the sixth input signal concerns a parameter associated with the ambient light, and receiving, by the controller, a seventh input signal from a seventh sensor associated with an air supply, where the seventh input signal concerns at least one of an air flow direction and an air flow rate associated with the air supply. If so, the controller also may control at least one parameter associated with comfort for the passenger based on at least one of the fourth input signal, the fifth input signal, the sixth input signal, and the seventh input signal.

The present invention also provides for an executable computer program product embodying instructions for a method of operation of a passenger service system. The executable program product includes instructions to receive, by the controller, a first input signal from a first sensor, where the first input signal concerns at least a position of a seat adapted to receive a passenger therein, receive, by the controller, a second input from a second sensor, where the second input signal concerns at least a presence of the passenger in the seat, and receive, by the controller, a third input from a third sensor, where the third input signal concerns at least one of a position, orientation and direction of motion of at least one hand of the passenger. The executable computer program product also is contemplated to adjust, by the controller, at least one parameter associated with light generated by a first light source based on the first input signal, the second input signal, and the third input signal.

With respect to the executable computer program product, it is contemplated that the instructions also may receive a passenger input signal from a passenger input device associated with the seat, where the passenger input corresponds to the at least one parameter associated with the light, and adjust, by the controller, the at least one parameter associated with the light based on the passenger input signal.

Still further, the executable computer program product may include instructions to receive, by the controller, a fourth input signal from a fourth sensor associated with a window shade, where the fourth input signal concerns a degree of openness of the window shade, receive, by the controller, a fifth input signal from a fifth sensor associated with a cabin light, where the fifth input signal concerns a parameter associated with the cabin light, receive, by the controller, a sixth input signal from a sixth sensor associated with an ambient light, where the sixth input signal concerns a parameter associated with the ambient light, and receive, by the controller, a seventh input signal from a seventh sensor associated with an air supply, where the seventh input signal concerns at least one of an air flow direction and an air flow rate associated with the air supply.

In addition, the executable computer program product may include instruction to adjust, by the controller, at least one parameter associated with comfort for the passenger based on at least one of the fourth input signal, the fifth input signal, the sixth input signal, and the seventh input signal.

Still other aspects of the present invention will be made apparent from the discussion that follows.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more embodiments. The discussion of any one particular embodiment or associated feature is not intended to be limiting of the present invention. To the contrary, the discussion of particular embodiments and features is intended to illustrate the breadth and scope of the present invention. There are numerous variations and equivalents that will be made apparent from the discussion that follows. Those variations and equivalents are intended to be encompassed by the scope of the present invention as if described herein.

With respect to various features that are discussed in connection with specific embodiments, it is noted that the features are not intended to be exclusive of one another. To the contrary, as should be apparent to those skilled in the art, several of the features may be combinable in arrangements that differ from the specific embodiments described below. Those combinations are contemplated to fall within the scope of the present invention.

Figure 1:
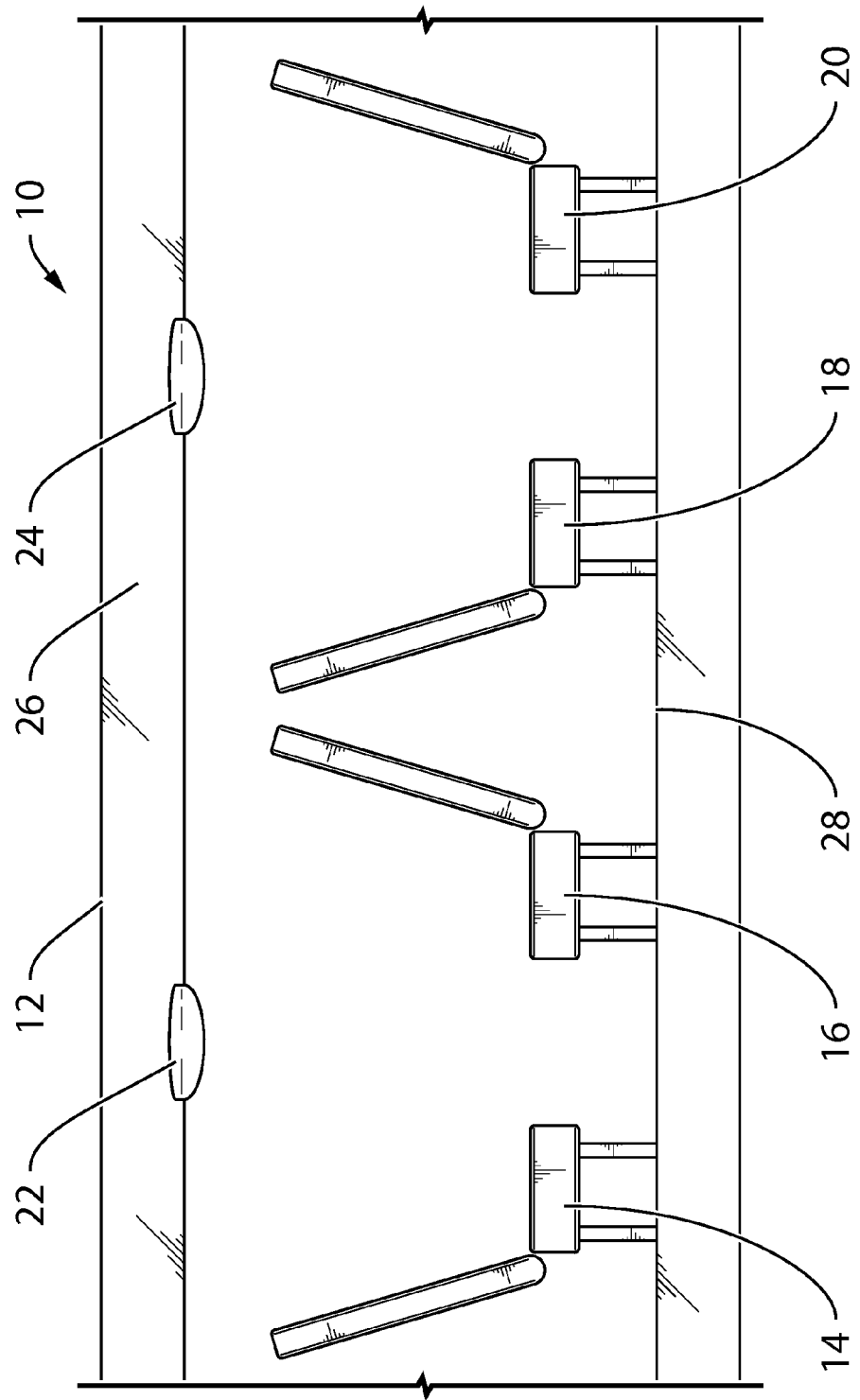
FIG. 1 is graphical representation of a cross-section of a portion of an interior of an aircraft cabin, showing the positions of four seats therein.

FIG. 1 is a graphical side view of one contemplated embodiment of the lighting system 10 of the present invention. The lighting system 10 is contemplated to be used within the cabin 12 of an aircraft. For reference, a portion of a cabin 12 of an aircraft is illustrated in FIG. 1. In particular, FIG. 1 shows four seats 14, 16, 18, 20 in an arrangement that may be contemplated for the cabin 12 of the aircraft, on one side of the center aisle of that cabin 12.

While the seating arrangement shown in FIG. 1 is illustrated in connection with the cabin 12 of an aircraft, the lighting system 10 of the present invention should not be understood to be limited solely to the cabin 12 of an aircraft. To the contrary, it is contemplated that the lighting system 10 of the present invention may be employed in the cabin of any vehicle. For example, the lighting system 10 of the present invention may be employed in a railway car, a boat, an automobile, or the like.

In addition, the present invention should not be understood to be limited to any particular seating arrangement. While FIG. 1 illustrates four seats 14, 16, 18, 20 arranged longitudinally with respect to one another, the present invention is contemplated to be applicable to any seating arrangement within the cabin 12 of the vehicle. Accordingly, the seating arrangement depicted in any of the figures should not be considered to be limiting of the present invention.

Next, it is noted that the lighting system 10 of the present invention is not intended to be limited solely to a passenger seating area. It is contemplated that the lighting system 10 of the present invention may be employed in a lavatory of a vehicle, in an aircraft galley, in a bedroom in a vehicle (i.e., an aircraft or a railway sleeping car), and a room within a cabin on a boat, among other potential environments.

As may be apparent from the illustrations appended hereto, the lighting system 10 of the present invention is contemplated to be employed within the cabin 12 of a private aircraft. A private aircraft (otherwise referred to as a "business aircraft") is an aircraft that is owned and/or operated by an individual or on behalf of a company (or other enterprise). Private aircraft typically are distinguishable from commercial aircraft in that private aircraft are usually smaller in size and accommodate a fewer number of passengers than commercial aircraft.

While the lighting system 10 of the present invention is contemplated to be employed in a cabin 12 of a private aircraft, the lighting system 10 may be employed in a commercial passenger aircraft as well. As noted, the lighting system 10 of the present invention is adaptable to virtually any suitable location, as indicated above and as should be apparent to those skilled in the art.

With continued reference to FIG. 1, the lighting system 10 of the present invention includes light fixtures 22, 24. The light fixtures 22, 24 are contemplated to be suspended above the passengers' heads. In one embodiment, as illustrated in FIG. 1, the light fixtures 22, 24 are suspended beneath an overhead storage area 26. As should be made apparent from the discussion that follows, the overhead storage area 26 is not critical to the construction or operation of the lighting system 10 of the present invention. The light fixtures 22, 24 alternatively may be affixed to a ceiling of the cabin 12.

As a point of reference, the seats 14, 16, 18, 20 are affixed to the floor 28 in the cabin 12 of the aircraft. As should be apparent to those skilled in the art, the seats 14, 16, 18, 20 in an aircraft typically are affixed to seating tracks (not shown), which are disposed in the floor 28 of the aircraft.

Two light fixtures 22, 24 are positioned in relationship to the seats 14, 16, 18, 20, as illustrated. While the embodiment illustrated in FIG. 1 shows two light fixtures 22, 24, it is contemplated that a larger or fewer number of light fixtures 22, 24 may be employed without departing from the scope of the present invention. In addition, it is noted that the light fixture to seat ratio in FIG. 1 is 1:2. This ratio is merely illustrative of one contemplated embodiment of the lighting system of the present invention. A different ratio may be employed without departing from the scope of the present invention.

Figure 2:
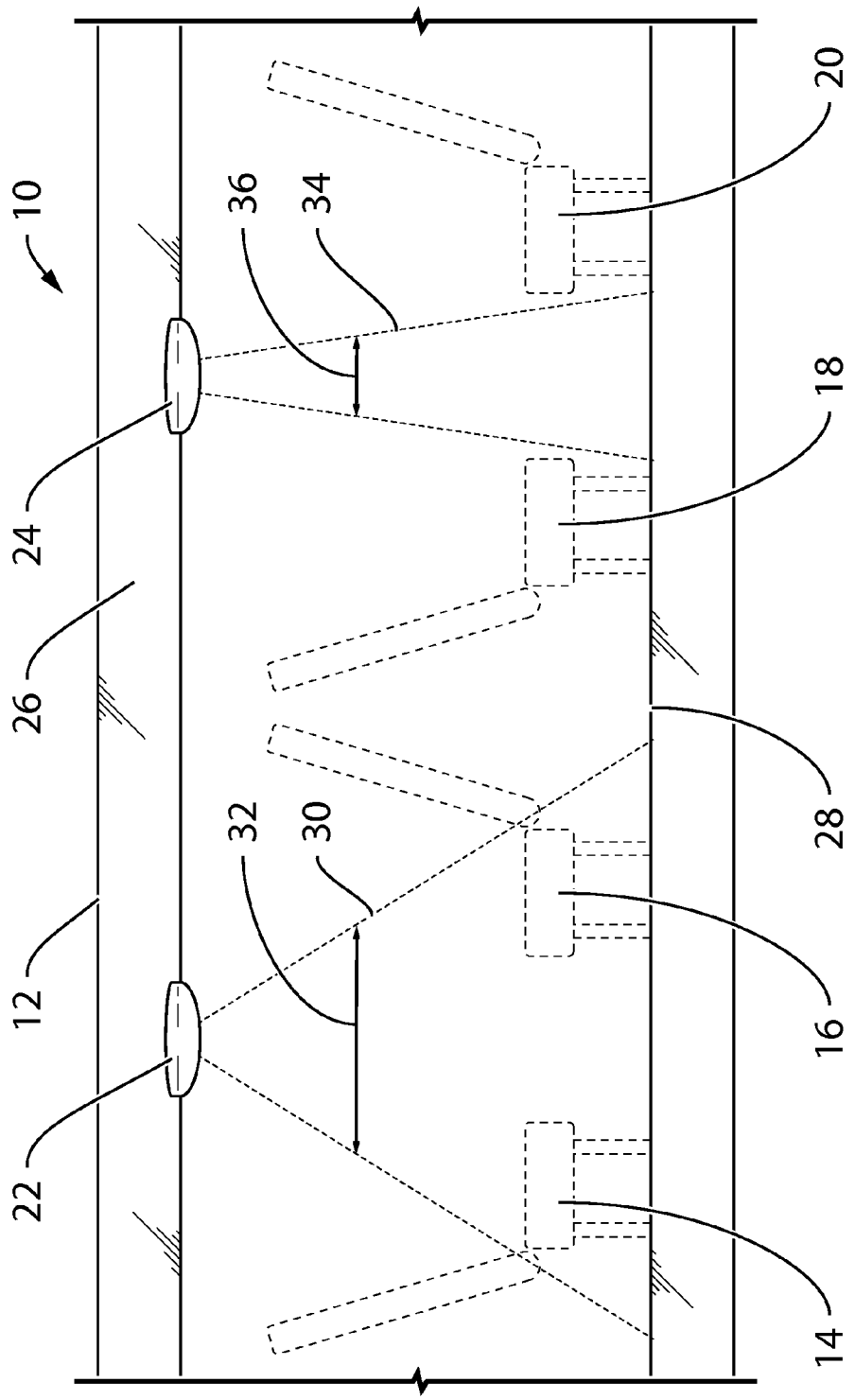
FIG. 2 is a graphical representation of the seats shown in FIG. 1, illustrating a first contemplated distribution of light for the lighting system of the present invention.

FIG. 2 is a graphical side view of the seating arrangement illustrated in FIG. 1. In this view, a first lighting pattern 30 is shown as being generated by the first light fixture 22. The first lighting pattern 30 is contemplated to have a first width 32 and correspond generally to a divergent volume within the cabin 12 of the aircraft.

As also shown in FIG. 2 in connection with the second light fixture 24, a second lighting pattern 34 is illustrated in connection with the second light fixture 24. The second lighting pattern 34 also is contemplated to have a generally divergent (i.e., conical) shape with a second width 36. As should be apparent from FIG. 2, the first lighting pattern 30 is wider than the second lighting pattern 34. While the lighting patterns 30, 34 may have the same shape and width in one contemplated embodiment, FIG. 2 illustrates one aspect of the present invention whereby the lighting patterns 30, 34 associated with the light fixtures 22, 24 need not be the same for each light fixture 22, 24. In fact, as further detailed in connection with FIGS. 3-5, the lighting patterns 30, 34 may take any of a number of different shapes without departing from the scope of the present invention.

Figure 3:
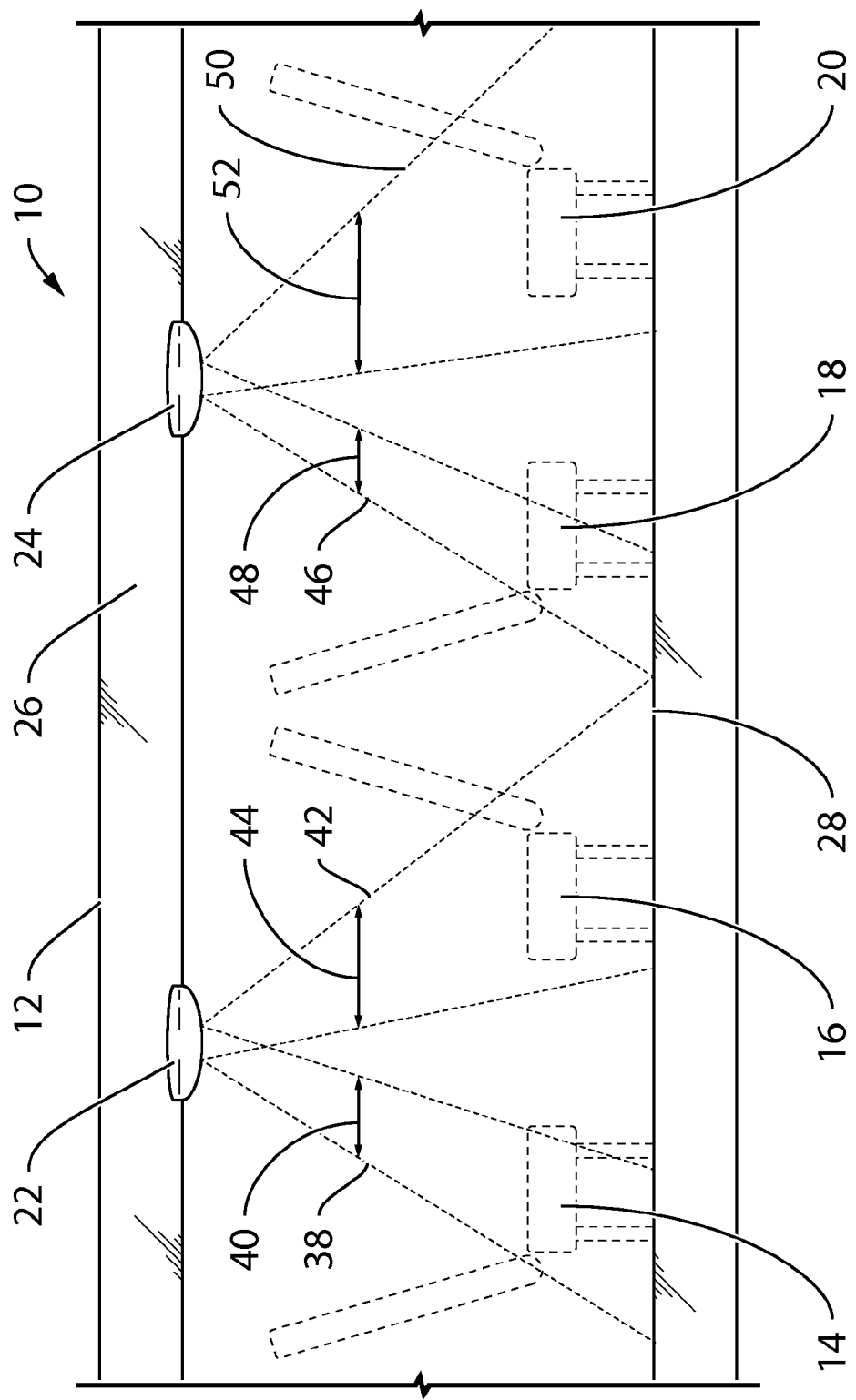
FIG. 3 is a graphical representation of the seats shown in FIG. 1, illustrating a second contemplated distribution of light for the lighting system of the present invention.

FIG. 3 is a graphical side view of the interior of the cabin 12 illustrated in FIG. 1. In this drawing, the light fixtures 22, 24 generate a third lighting pattern 38 with a third width 40, a fourth lighting pattern 42 with a fourth width 44, a fifth lighting pattern 46 with a fifth width 48, and a sixth lighting pattern 50 with a sixth width 52. As illustrated in FIG. 2, each of the lighting patterns 38, 42, 46, 50 differ from one another. As should be apparent, the lighting patterns 38, 42, 46, 50 may be the identical to one another without departing from the scope of the present invention. Moreover, it is contemplated that two or more of the lighting patterns 38, 42, 46, 50 may be the same while the remaining patterns differ therefrom.

Figure 4:
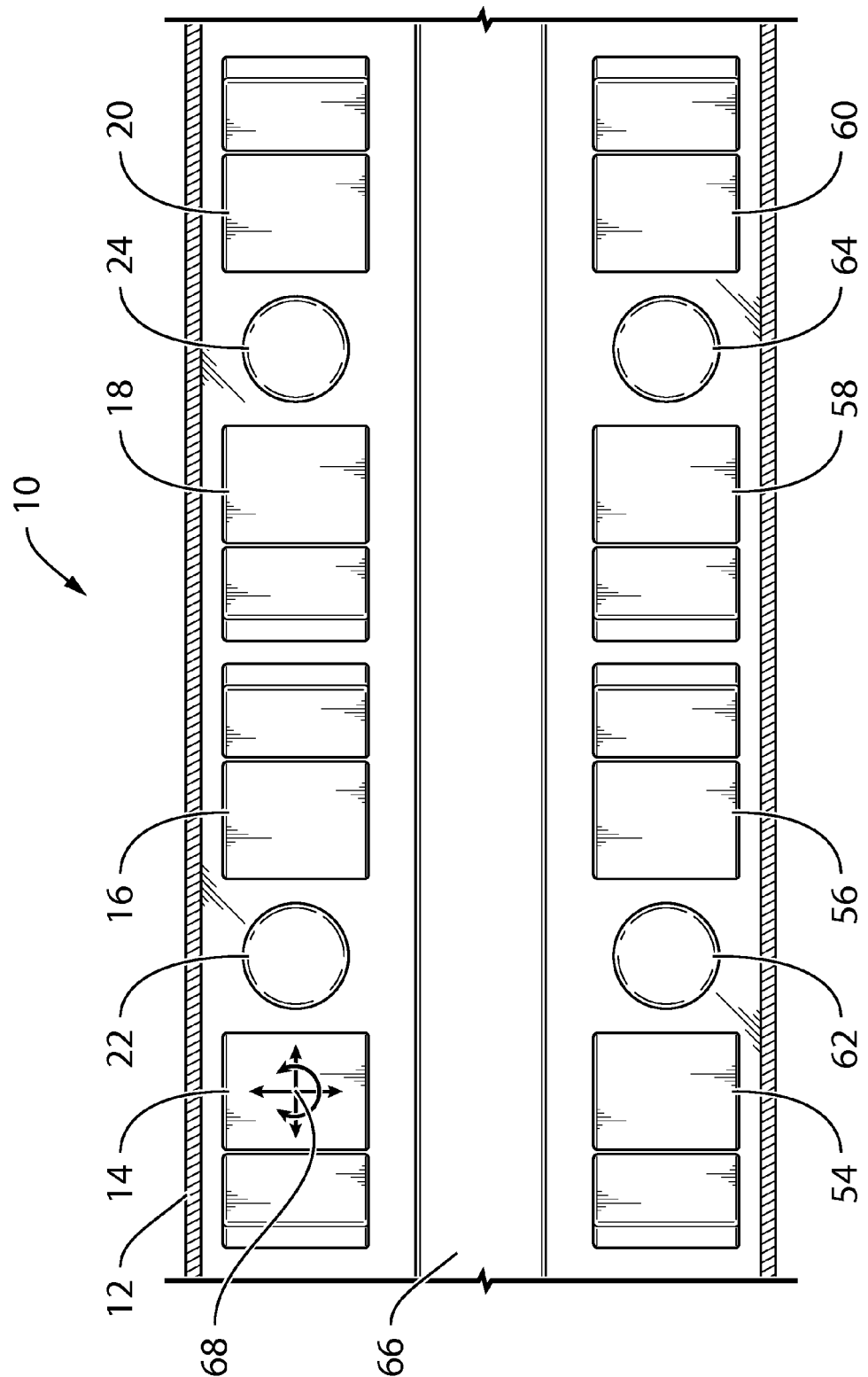
FIG. 4 is a graphical top view of a portion of an interior of an aircraft cabin, showing one contemplated positional relationship between the seats and the light fixtures.

FIG. 4 is a graphical, top view of the portion of the cabin 12 illustrated in FIGS. 1-3. The cabin 12 includes seats 54, 56, 58, 60 that are disposed opposite to the seats 14, 16, 18, 20. A third light fixture 62 is disposed between seats 54 and 56. A fourth light fixture 64 is disposed between seats 58 and 60. The seats 54, 56, 58, 60 sit across an aisle 66 from the seats 14, 16, 18, 20.

As noted above, the arrangement of seats 14, 16, 18, 20, 54, 56, 58, 60 and light fixtures 22, 24, 62, 64 is merely exemplary of one contemplated embodiment of the present invention. A larger or fewer number of light fixtures 22, 24, 62, 64 may be employed without departing from the scope of the present invention. In addition, the light fixtures 22, 24, 62, 64 may be positioned at any location within the cabin 12 without departing from the scope of the present invention.

FIG. 4 also includes a depiction of arrows 68. The arrows 68 indicate that each of the seats 14, 16, 18, 20, 54, 56, 58, 60 may be repositioned within the cabin 12 of the aircraft. In particular, the seats 14, 16, 18, 20, 54, 56, 58, 60 are permitted to move forwardly, rearwardly, in a starboard direction, and/or in a port direction as required or as desired. In addition, the seats 14, 16, 18, 20, 54, 56, 58, 60 are permitted to rotate about a pivot axis that intersects with a seat pan thereof. In other words, the seats 14, 16 18, 20, 54, 56, 58, 60 are contemplated to be provided with several degrees of freedom with respect to movement.

It is noted that the present invention is not limited to seats 24, 26, 28, 20, 54, 56, 58, 60 with as many degrees of freedom of movement as are illustrated in FIG. 4. It is contemplated that the seat 14, 16, 18, 20, 54, 56, 58, 60 may have a fewer (or greater) number of degrees of freedom of movement without departing from the scope of the present invention.

Figure 5:
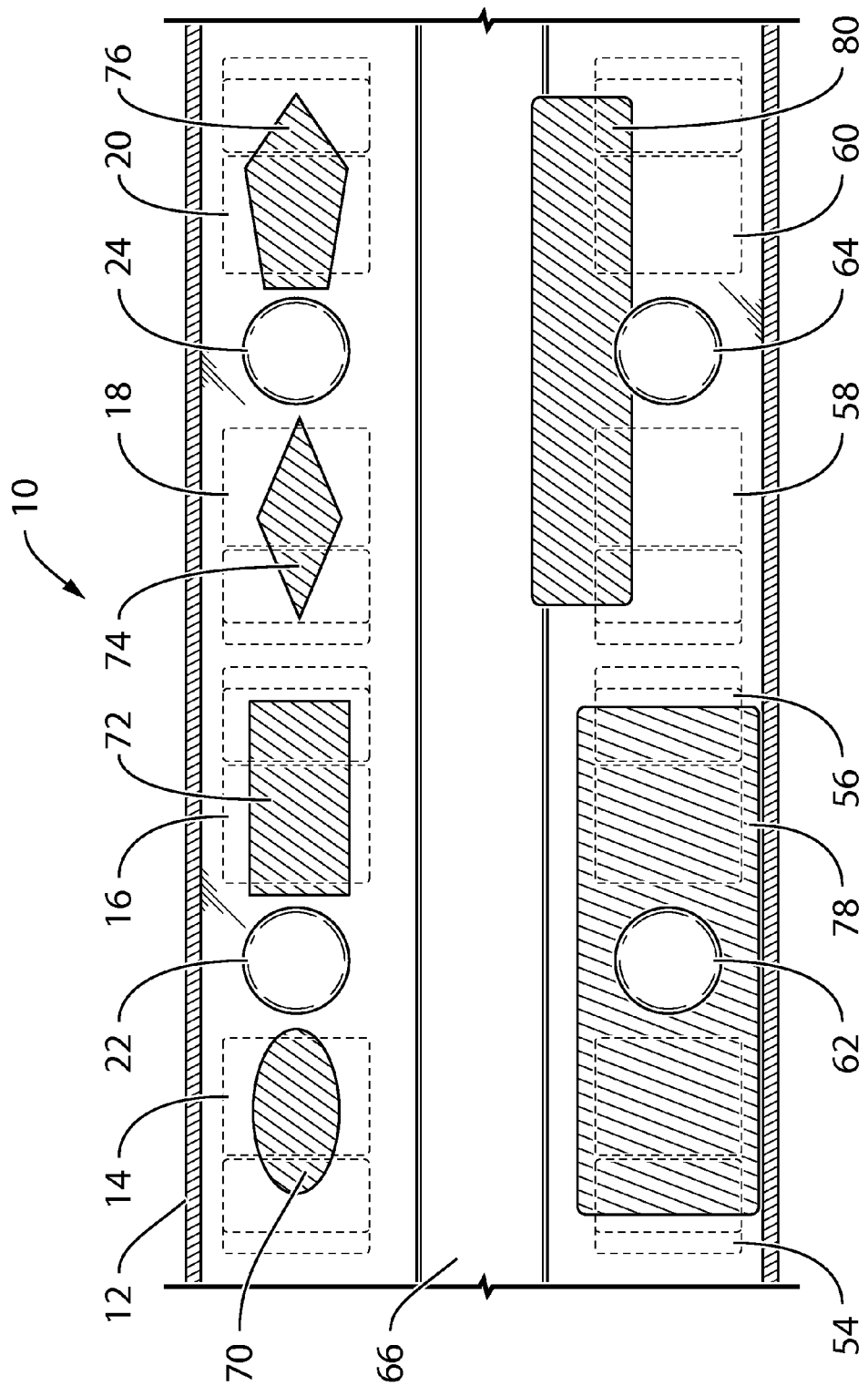
FIG. 5 is a graphical top view of the interior of the aircraft cabin illustrated in FIG. 4, showing various lighting patterns that may be generated by the light fixtures forming a part of the system of the present invention.

FIG. 5 is a graphical, top view of the interior of the cabin 12 of the aircraft similar to the depiction in FIG. 4. In FIG. 5, however, various projected lighting patterns 70, 72, 74, 76, 78, 80 are illustrated. Having been projected onto the floor 28 of the aircraft, the projected lighting patterns 70, 72, 74, 76, 78, 80 delimit specific areas on the floor 28 of the cabin 12 of the aircraft. Accordingly, the projected lighting patterns 70, 72, 74, 76, 68, 80 are parallel to a plane defined by the floor 28 of the cabin 12.

The first projected lighting pattern 70 is elliptical and overlaps a portion of the first seat 14. The second projected lighting pattern 72 is rectangular in shape and overlaps a portion of the second seat 16. The third projected lighting pattern 74 is diamond-shaped and overlaps the third seat 18. The fourth projected lighting pattern 76 is polygonal (i.e., pentagonal) in shape and overlaps a portion of the fourth seat 20. The fifth projected lighting pattern 78 is rectangular in shape and overlaps portions of the fifth seat 54 and the sixth seat 56. The sixth projected light pattern 80 also is rectangularly-shaped and overlaps portions of the seventh seat 58 and the eighth seat 60.

As should be apparent from FIG. 5, the projected lighting patterns 70, 72, 74, 76, 78, 80 may have any shape as may be required or desired for a particular lighting situation. In addition, the projected lighting patterns 70, 72, 74, 76, 78, 80 may be centered on one or more of the seats 14, 16, 18, 20, 54, 56, 58, 60. Alternatively, the projected lighting patterns 70, 72, 74, 76, 78, 80 may be offset from one or more of the seats 14, 16, 18, 20, 54, 56, 58, 60. There are innumerable variations contemplated for the projected lighting patterns 70, 72, 74, 76, 78, 80. Accordingly, the illustrated variants are intended to be exemplary of the wide breath of possible shapes, positions, and orientations of the lighting patterns generated by the light fixtures 22, 24, 62, 64.

Figure 6:
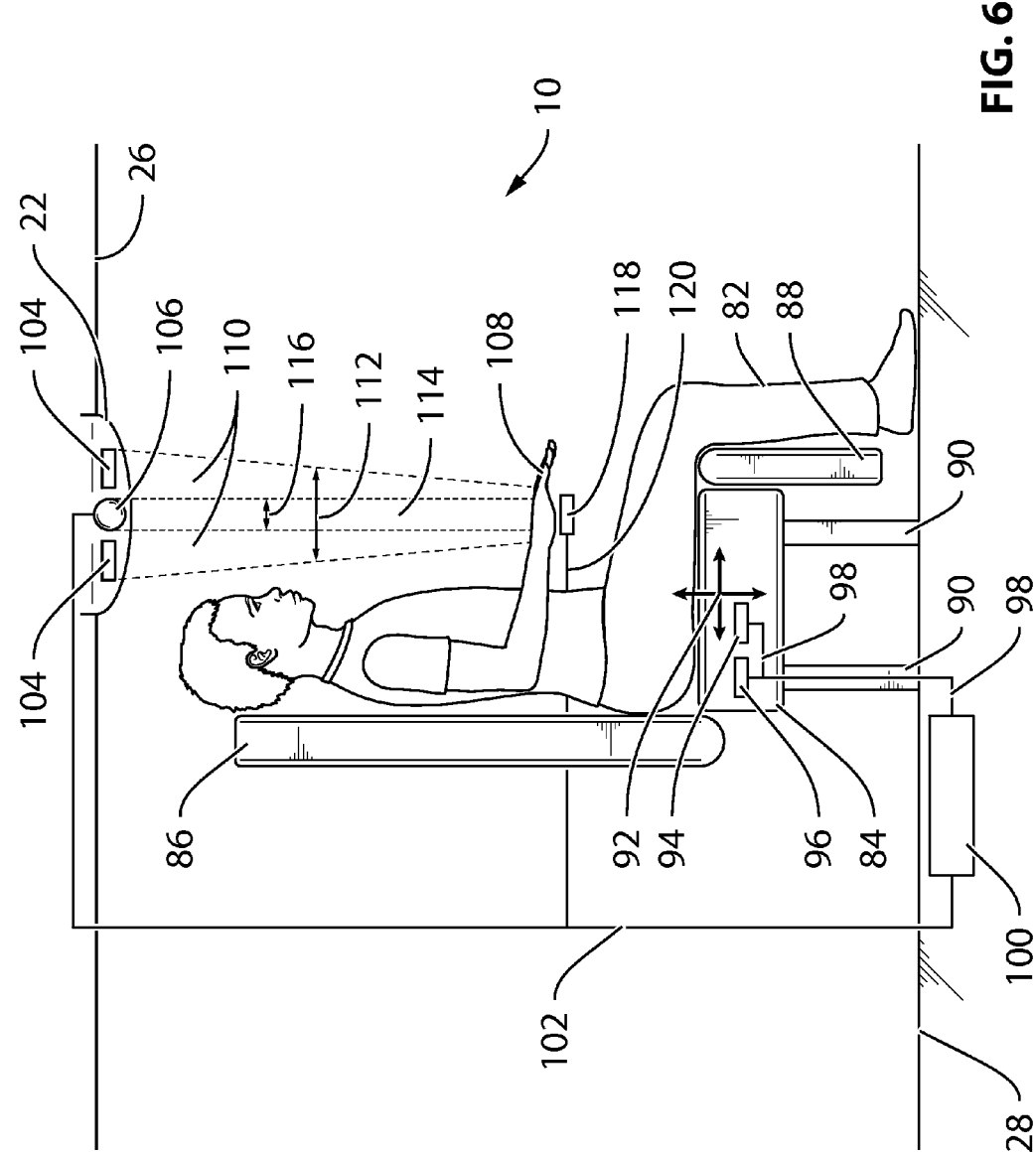
FIG. 6 is a graphical side view of a single seat as may be used in connection with a first embodiment of the lighting system of the present invention, with the seat being shown in an upright orientation.
Figure 7:
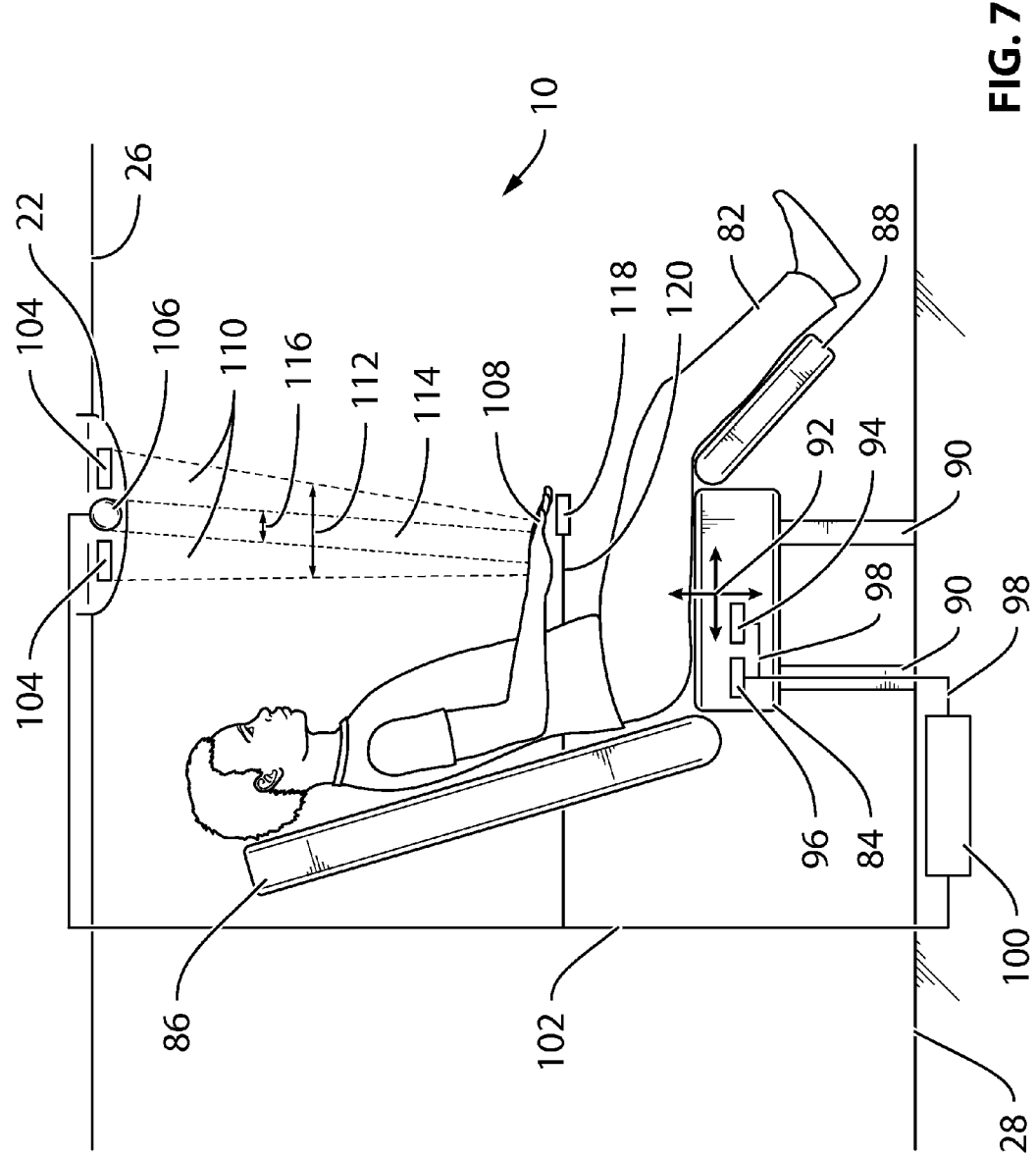
FIG. 7 is a graphical side view of the lighting system associated with the single seat shown in FIG. 6, with the seat being shown in a napping orientation.
Figure 8:
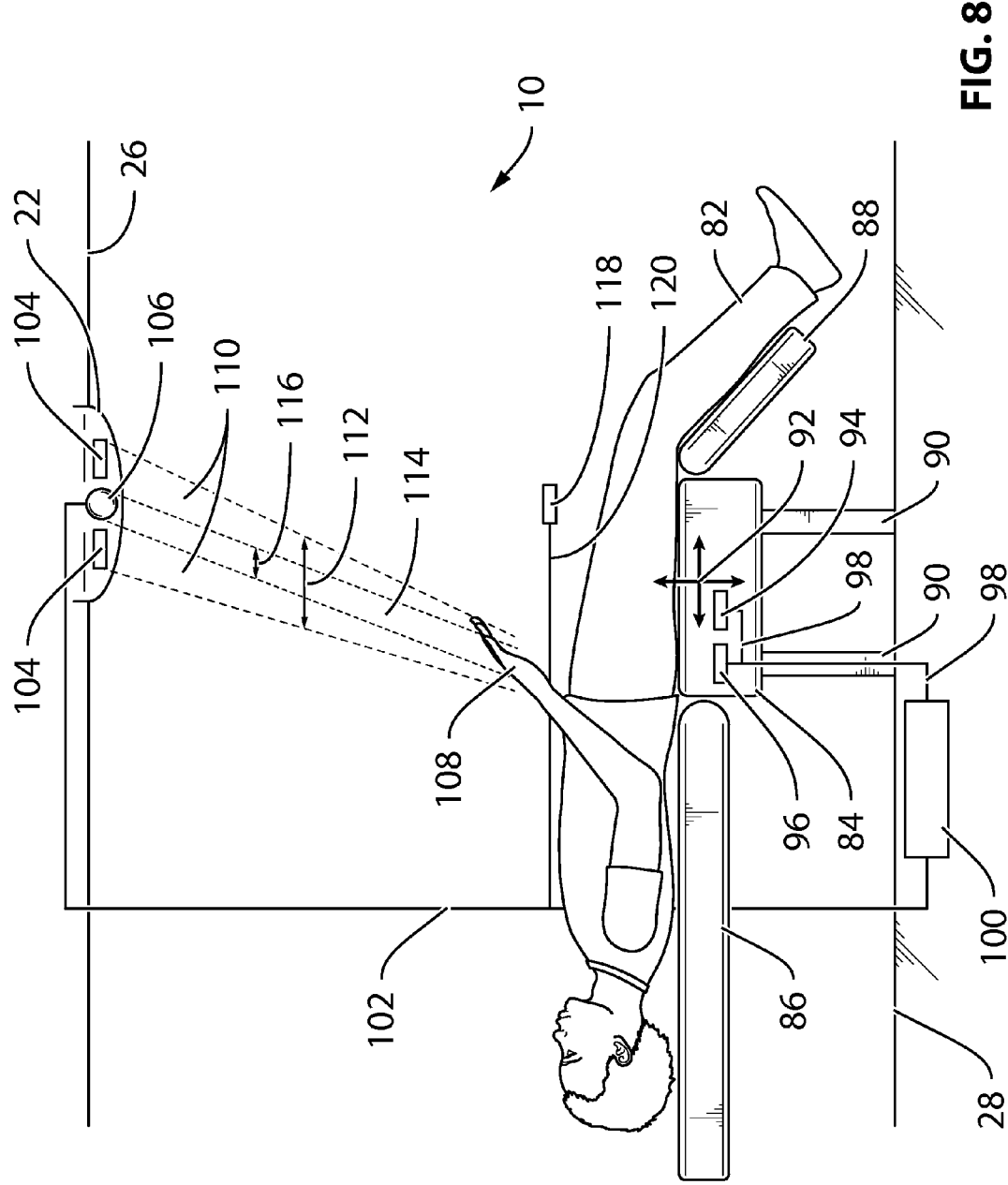
FIG. 8 is a graphical side view of the lighting system associated with the single seat shown in FIG. 6, with the seat being shown in a berthing orientation.

FIGS. 6-8 are graphical, side view representations of a passenger 82 seated in one of the seats, for example, the seat 14, in the cabin 12 of the aircraft. For purposes of the discussion that follows, the seat 14 is considered to be representative of any seat 14, 16, 18, 20, 54, 56, 58, 60 in the cabin 12. Moreover, the passenger 82 is considered to be representative of any passenger 82 within the cabin 12 of the aircraft.

In FIG. 6, the seat 14 is shown in an upright position. This position may be the position of the seat 14 that is required for taxi, take-off and landing (also referred to as "the TTL position"). In FIG. 7, the seat 14 is shown in a relaxed position (also referred to as "the napping position"). In the napping position, the seat 14 is not in a completely upright position as compared with the TTL position. In FIG. 8, the seat 14 is shown in a sleeping position (also referred to as "the berthing position" or "the berthed position"). In this orientation, the seat 14 supports the passenger 82 is a substantially horizontal orientation with respect to the floor 28 of the aircraft.

With continued reference to FIG. 6, the lighting system 10 of the present invention is intended to operate in cooperation with the seat 14. This cooperation is discussed in greater detail in the paragraphs that follow. The lighting system 10 also may be constructed to provide cooperation between multiple seats 14, 16, 18, 20, 54, 56, 58, 60 and other comfort features within the cabin 12 of the aircraft, as discussed in greater detail below.

The seat 14 is depicted as a lounge chair with a seat pan 84, a backrest 86, and a leg rest 88. The seat pan 84 is supported by one or more legs 90, which are connected to tracks (not shown) in the floor 28 of the cabin 12. It is noted that this graphical representation of the seat 14 is intended to be merely illustrative of a seat 14. The illustration is not intended to be limiting of the present invention in any manner. It is contemplated, for example, that the seat 14 will have a construction including frame elements and a swivel to permit the seat 14 to transition in any of the directions indicated by the arrows 68 in FIG. 3. The seat 14 also is contemplated to include arm rests adjacent to the seat pan 84.

As discussed above, the seat 14 is contemplated to be moveable in forward and/or rearward directions, among others (i.e., arrows 68). As illustrated in FIG. 6, and as suggested by the arrows 92, the seat 14 also may be adjustable in a height direction (i.e., up and/or down with respect to the floor 28 of the cabin of the aircraft). As before the arrows 92 are not intended to be limiting of the scope of the present invention.

With continuing reference to FIG. 6, the lighting system 10 includes a first sensor 94 disposed within the seat 14. The first sensor 94 is contemplated to detect (or sense) the seat position. In other words, the first sensor 94 is adapted to sense if the seat 14 is in the TTL position shown in FIG. 6, in the napping position shown in FIG. 7, or in the berthed position shown in FIG. 8, among other positions. For this reason, the first sensor 94 also is referred to as the seat position sensor 94.

As may be appreciated by those skilled in the art, the seat position sensor 94 need not be located in the seat pan 84. The seat position sensor 94 may be located in any other part of the seat 14 that permits the seat position sensor 94 to determine the position of the seat 14. The seat position sensor 94 may be an active or a passive device located in, on, or near to the seat 14 to detect the position of the seat 14.

Separately, it is contemplated that the seat position sensor 94 may be embodied partially or wholly in software. As such the seat position sensor 94 may determine the seat position based on one or more signal inputs and/or outputs associated with the seat 14 and related componentry. For example, the seat position sensor 94 may be encoded as software resident on a processor that receives information about the degree to which the position of the seat 14 have been altered, for example, by a passenger 82 inputting one or more signals to change the position of the seat 14. The seat position sensor 94, embodied as software, may be encoded to determine the position of the seat 14 based on the input signals provided by the passenger 82.

In addition, it is noted that the seat 14 need not be designed such that it may be moved between discrete positions as illustrated in FIGS. 6-8. To the contrary, the seat 14 may be designed to be positioned in any of an infinite number of positions between the TTL position (FIG. 6) and the berthed position (FIG. 8), as should be apparent to those skilled in the art.

With continued reference to FIG. 6, the seat 14 also is contemplated to include a second sensor 96. The second sensor 96 is contemplated to detect the presence of a passenger 82 in the seat 14. One simple way to determine the presence of a passenger 82 in the seat 14 is to measure (or sense) the amount of weight present on the seat pan 84. At least for this reason, the second seat sensor 96 also is referred to as a weight sensor.

It is not required that the second seat sensor 96 be a weight sensor. Moreover, to practice the lighting system 10 of the present invention, the second seat sensor 96 need not be located in the seat pan 84. To the contrary, other types of sensors may be employed without departing from the scope of the present invention. Moreover, the second sensor 96 may be located in other places in, on, or near to the seat 14 to determine of the seat 14 is occupied.

Still further it is contemplated that the second seat sensor 96 may be embodied partially or wholly in software. For example, when a person boards the aircraft, the person's seat assignment may be associated with that passenger 82 and an electronic signal may be generated in connection therewith. For this reason, it is contemplated that the presence of the passenger 82 may be conditioned upon receipt of a signal associated with an embarkation by the passenger 82 onto the aircraft. As should be apparent to those skilled in the art, there are still further embodiments of the second sensor 96 that may be employed by the present invention without departing from the scope thereof.

The first sensor 94 and the second sensor 96 are connected, via a communication line 98, to a controller 100. While a single communication line 98 is depicted, multiple communication lines may be employed without departing from the scope of the present invention. The controller 100 connects to the first light fixture 22 via a communication line 102.

The first light fixture 22 includes one or more third sensors 104 and at least one light source 106.

The third sensors 104 may be of any type capable of sensing at least the location and configuration of the hands 108 of the passenger 82. As discussed below, it is contemplated that the third sensors 104 will be configured to detect at least the position, configuration, and direction of movement of the hands 108 of the passenger 82 so that information may be derived therefrom for control over the light source 106.

It is also contemplated that the third sensors 104 may not be part of the first light fixture 22 and be located in other areas of the cabin 12 of the aircraft, without departing from the scope of the present invention. Other areas of the cabin 12 may include, without being limited thereto, side panels, roof panels and bulkhead dividing space within the cabin 12.

It is contemplated that the light source 106 will include at least one light emitting diode ("LED") as the light generator for the light fixture 22. Multiple light emitting diodes (or other light emitters, including incandescent light bulbs, also may be employed without departing from the scope of the present invention.

In connection with the description of the lighting system 10 of the present invention, the sensors 104 also are referred to as "hand sensors" since they are contemplated to detect at least the location, orientation, and direction of movement of the hands 108 of the passenger 82. Moreover, while the first light fixture 22 is illustrated with two hand sensors 104, a larger or a fewer number may be employed without departing from the scope of the present invention.

While the light fixture 22 is shown with a single light source 106, it is noted that the light source 106 may be a single light generator or may combine multiple light generators together. In other words, the light source 106 should not be understood as a single LED for purposes of the present invention. The present invention contemplates innumerable variants for the light source 106, as should be apparent to those skilled in the art.

The hand sensors 104 are contemplated to generate a hand sensing column 110 that establishes a three-dimensional zone within which the hand sensors 104 are capable of detecting the location, orientation, and direction of movement of the hands 108 of the passenger 82. To facilitate an understanding of the present invention, a graphical representation of a hand sensing column 110 is illustrated. The hand sensing column 110 is illustrated with a hand sensing column width 112. While this particular width 112 is illustrated, the present invention should not be understood to be limited solely to such a configuration. In addition, the hand sensing column 110 may have any shape and/or size without departing from the scope of the present invention.

As illustrated in FIG. 6, the light source 106 generates light within a light column 114 having a light column width 116. While the light source 106 is illustrated as generating a light column 114, the present invention is not limited solely to the embodiment illustrated. The light column 114 may have any suitable shape and size, as required or as desired, while remaining within the intended scope of the present invention.

Figure 13:
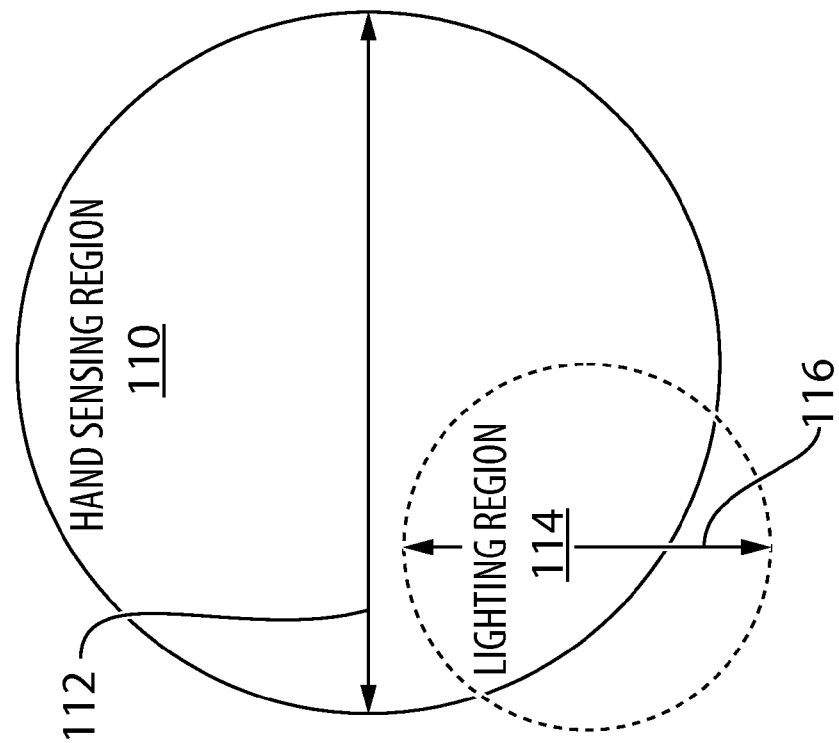
FIG. 13 is a graphical representation of a second contemplated relationship between a hand sensing region and a lighting region according to the present invention.
Figure 12:
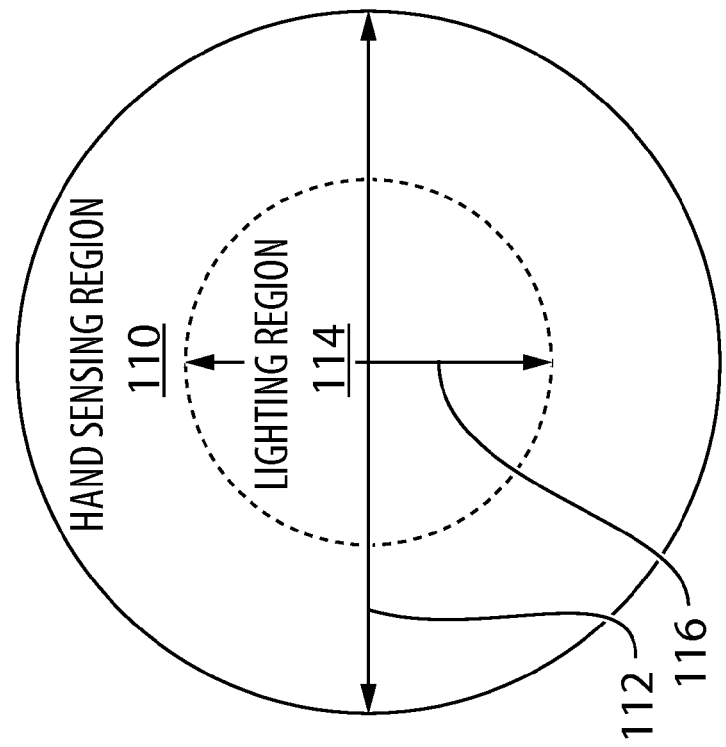
FIG. 12 is a graphical representation of a first contemplated relationship between a hand sensing region and a lighting region according to the present invention.

As discussed in connection with FIGS. 12 and 13 below, it is contemplated, in at least one embodiment, that the lighting system 10 of the present invention will generate a hand sensing column 110 that is surrounded by the light column 114. In other words, it is contemplated that the hand sensing column 110 and the light column 114 will be generated such that they overlap one another, at least in part. With such an operation of the lighting system 10 of the present invention, it is contemplated that light will be directed (or at least generally available) in the vicinity of the hands 108 of the passenger 82. In FIGS. 12 and 13, the light region for the hands 108 is designated by the term "lighting region." Similarly, the hand sensing column 110 is designated as the "hand sensing region."

FIG. 7 illustrates the seat 14 in a napping position. Here, the trajectories of the hand sensing column 110 and the light column 114 have been changed, by the controller 100 (or other control processor and/or system), to accommodate the change in the location of the hands 108 of the passenger 82.

FIG. 8 illustrates the seat 14 in the berthed position. Here, the hands 108 of the passenger 82 have moved to still another location. As a result, the controller 100 has interpreted the various inputs provided thereto and has adjusted the trajectories of the hand sensing column and the light column to compensate for the location of the hands 108 when the seat 14 is in this orientation.

It is noted that, in each of FIGS. 6-8, the light column 114 is shown as being directed to the hands 108 of the passenger 82. However, this is merely one contemplated shape for the light column 114. As discussed in connection with FIG. 5, the light fixture 22 may generate light in any of a number of different projected light patterns 70, 72, 74, 76, 78, 80. It is also contemplated that the light column 114 will be altered in shape, depending on the orientation of the seat, to any of the exemplary projected light patterns 70, 72, 74, 76, 78, 80 (or any other patterns as required or as desired).

FIGS. 6-8 also illustrate one further aspect of the lighting system 10 of the present invention. In particular, a passenger input device 118 may be connected to the controller 100 via a communication line 120. It is contemplated that the passenger 82 may desire to adjust aspects of the light column 114 to suit personal tastes. Inputs provided via the passenger input device 118 are transmitted, as passenger signals, to the controller 100. Where provided, the passenger input signals may be taken into account when the controller 100 issues commands to the light fixture 22 to generate a suitable light column 114.

The passenger input device 118 (also referred to as a passenger interface 118) may be a control panel incorporated into an armrest of the seat 14. Alternatively, the passenger input device 118 may be a touch-screen interface disposed on or near the seat 14. Still other variants for the passenger input device 118 are contemplated to fall within the scope of the present invention.

Figure 9:
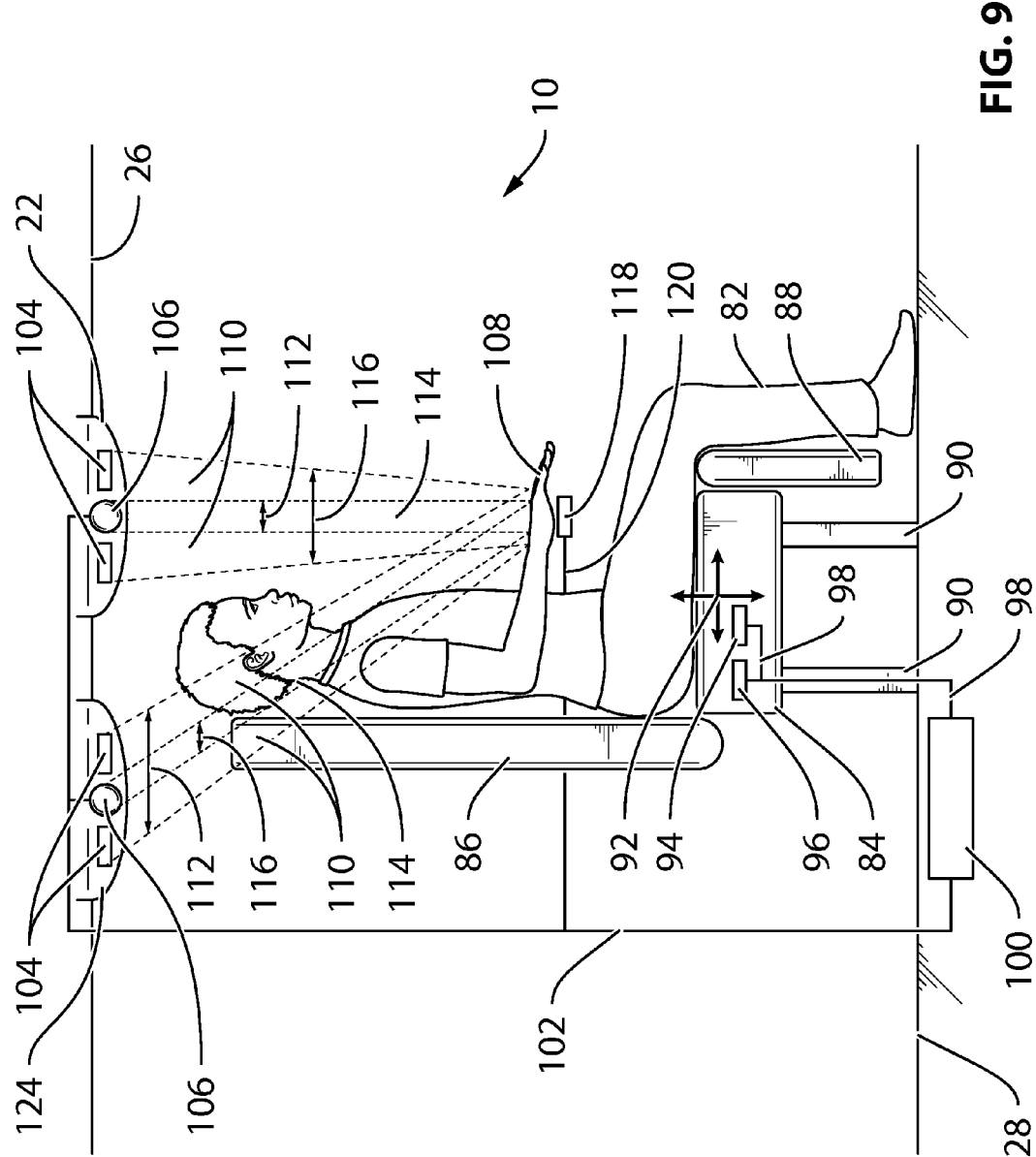
FIG. 9 is a graphical side view of a single seat as may be used in connection with a second embodiment of the lighting system of the present invention, with the seat being shown in an upright orientation.

FIG. 9 is a graphical side view of a single seat as may be used in connection with a second embodiment of the lighting system 122. As in FIG. 6, the seat 14 is shown in an upright orientation (otherwise referred to as the TTL orientation).

The lighting system 122 is similar to the lighting system 10 illustrated in FIGS. 6-8. However, in the lighting system 122, a second light fixture 124 is disposed on the overhead storage area 26 above the seat 14.

It is noted that the light fixture 124 is contemplated to be identical to the light fixture 22. However, the light fixture 124 need not be the same as the light fixture 22. To the contrary, the light fixtures 22, 124 may differ in construction and operation from one another without departing from the scope of the present invention.

As with the light fixture 22, the light fixture 124 may or may not include a light source 106 and one or more third sensors (or hand sensors) 104. Similar to the light fixture 22, the light fixture 124 generates a hand sensing column 110 with a hand sensing column width 112. The light fixture 124 also generates a light column 114 with a light column width 116.

In the lighting system 122, the light fixture 22 is located in a forward location with respect to the seat 14. The light fixture 124 is positioned in a rearward location with respect to the seat 14. The positions of the light fixtures 22, 124 in forward and rearward positions is contemplated to provide overlapping hand sensing columns 110 (and, therefore, overlapping hand sensing regions) to ensure adequate control over the light source 106. Additionally, the positions of the light fixtures 22, 124 in forward and rearward positions is contemplated to provide overlapping light columns 114 (and, therefore, overlapping light regions) to ensure adequate illumination at or near the hands 108 of the passenger 82 in the seat 14.

As noted above, FIG. 10 is a graphical side view of the lighting system associated with the single seat shown in FIG. 9, with the seat being shown in a napping orientation. Similarly, FIG. 11 is a graphical side view of the lighting system associated with the single seat shown in FIG. 9, with the seat being shown in a berthing orientation.

Figure 10:
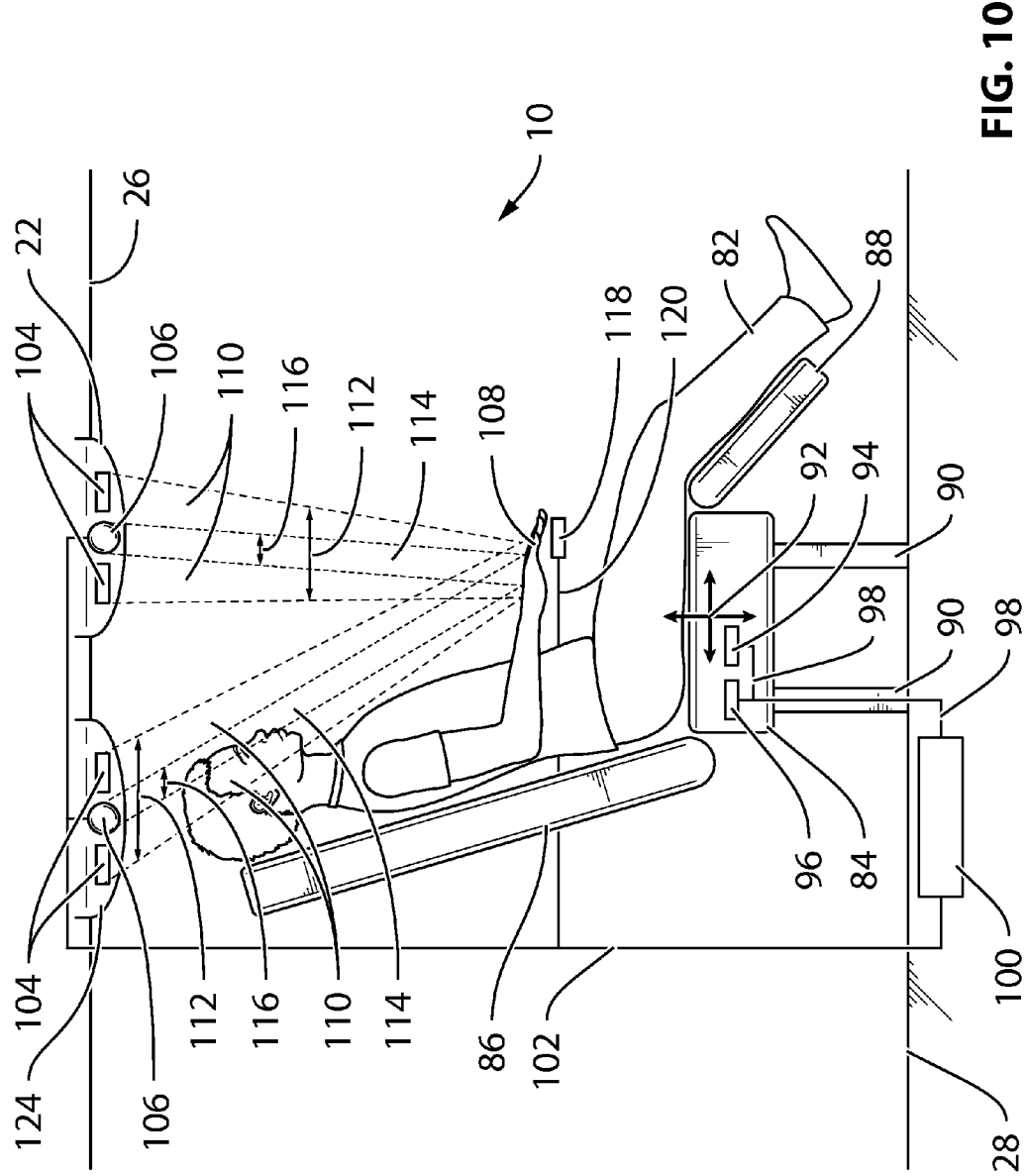
FIG. 10 is a graphical side view of the lighting system associated with the single seat shown in FIG. 9, with the seat being shown in a napping orientation.
Figure 11:
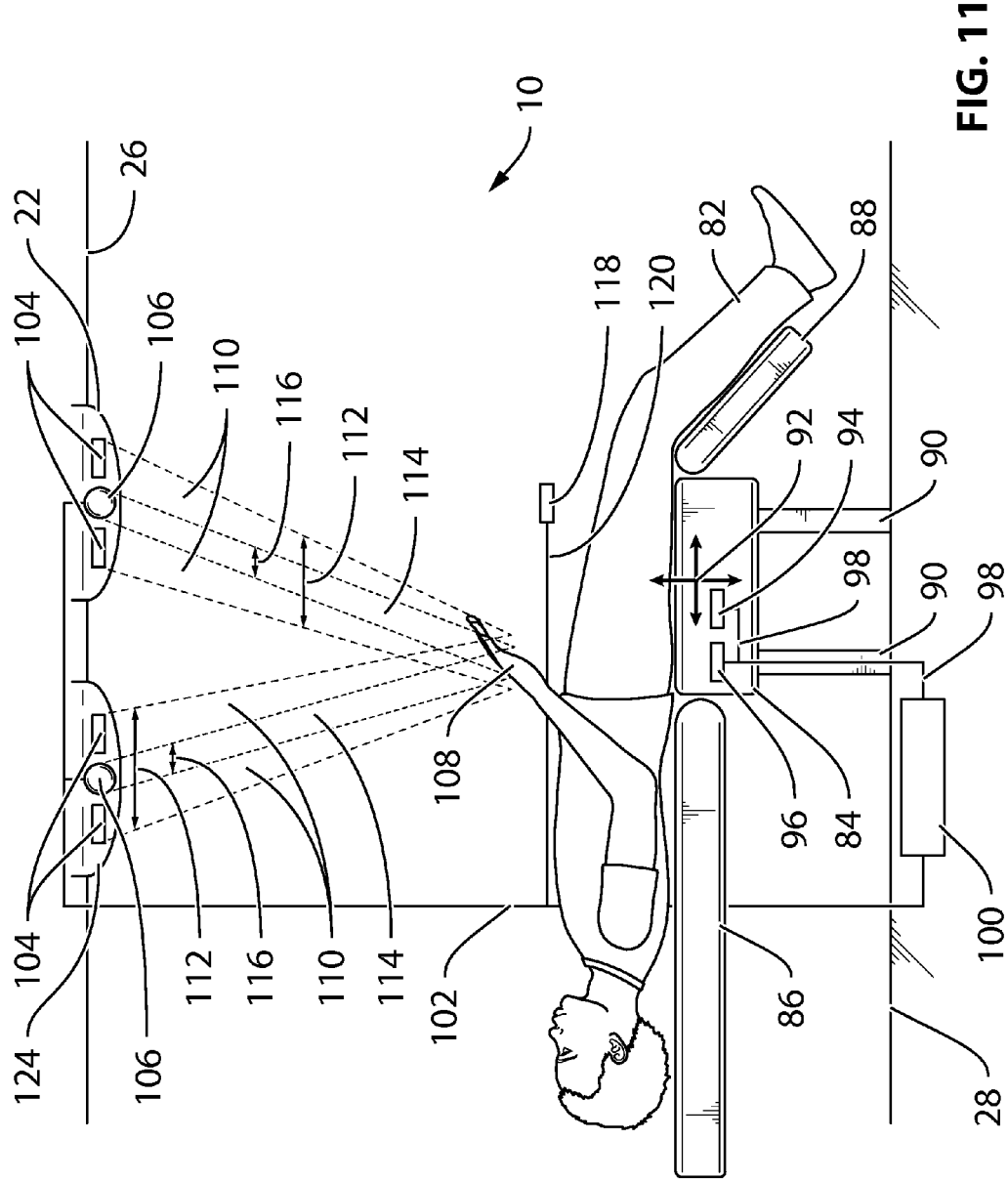
FIG. 11 is a graphical side view of the lighting system associated with the single seat shown in FIG. 9, with the seat being shown in a berthing orientation.

As may be apparent from FIGS. 9-11, the light fixture 124 is contemplated to have an increasing ability to detect the hands 108 of the passenger 82 as the seat 14 transitions from the TTL orientation to the berthed orientation. Similarly, it is contemplated that the light fixture 124 will have an increasing ability to illuminate the hands 108 of the passenger 82 as the seat 14 transitions from the TTL position to the berthed position.

FIG. 12 illustrates a first contemplated relationship between the hand sensing column 110 and the light column 114 discussed in connection with FIGS. 6-8 and 9-11. As illustrated in FIG. 12, it is contemplated that the hand sensing column 110 and the light column 114 will be concentrically oriented with respect to one another. In this configuration, the hand sensing column 110 completely encompasses (or surrounds) the light column 110.

FIG. 13 illustrates a second contemplated relationship between the hand sensing column 110 and the light column 114. This second contemplated relationship is a variation of the first embodiment that is shown in FIG. 12. Here, the hand sensing column 110 encompasses the light column 114 only in part. As such, the lighting area is dissociated from the location of the hands 108 of the passenger 82. The orientation illustrated in FIG. 13 may be applied in instances where, for example, the light column 114 is incapable of providing illumination in a particular area of the cabin 12 of the aircraft.

FIGS. 12 and 13 illustrate two possible relationships between the hand sensing column 110 and the light column 114. In both cases, consistent with the present invention, it is contemplated that the hand sensing column 110 overlaps, at least in part, the light column 114. It is noted that there may be instances where the hand sensing column 110 and the light column 114 do not overlap. The lighting systems 10, 122 of the present invention are intended to encompass such instances as well. However, circumstances of non-overlap are contemplated to be less desirable.

Figure 15:
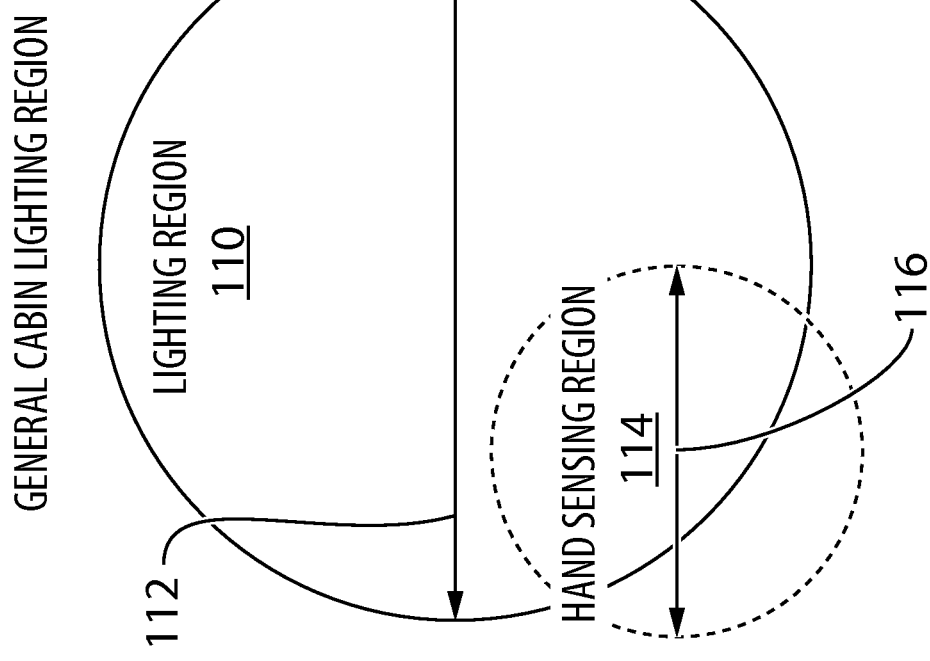
FIG. 15 is a graphical representation of a fourth contemplated relationship between a hand sensing region and a lighting region according to the present invention.
Figure 14:
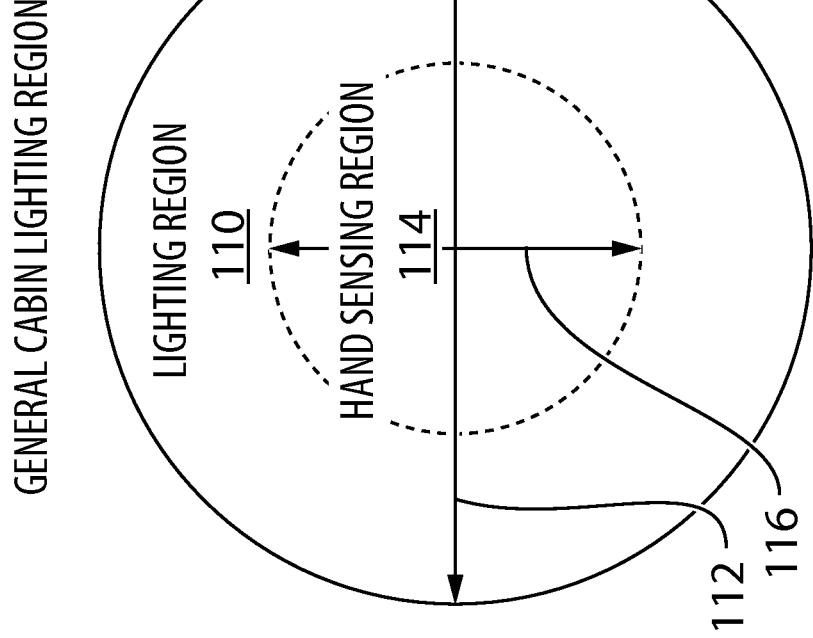
FIG. 14 is a graphical representation of a third contemplated relationship between a hand sensing region and a lighting region according to the present invention.

FIGS. 14 and 15 illustrate third and fourth contemplated relationships between the hand sensing column 110 and the light column 114. In FIGS. 14 and 15, the lighting columns 114 are larger than the hand sensing columns 110. This represents a reversal of the relationships illustrated in FIGS. 12 and 13. In these embodiments, the light column 114 (and, therefore, the resulting lighting region) encompasses the hand sensing column 110 (and, therefore, the hand sensing region) at least in part.

As noted above, one aspect of the present invention is to provide light in the area of the hands 108 of a passenger 82. More specifically, the present invention is contemplated to provide illumination in the general working area for the passenger 82. In other words, it is contemplated that the location of the hands 108 of the passenger 82 will define, in most instances, the location where the passenger 82 would prefer the light column 114 to be directed. In most instances, the passenger 82 will be working, reading, eating, or performing tasks where light is considered helpful.

Figure 16:
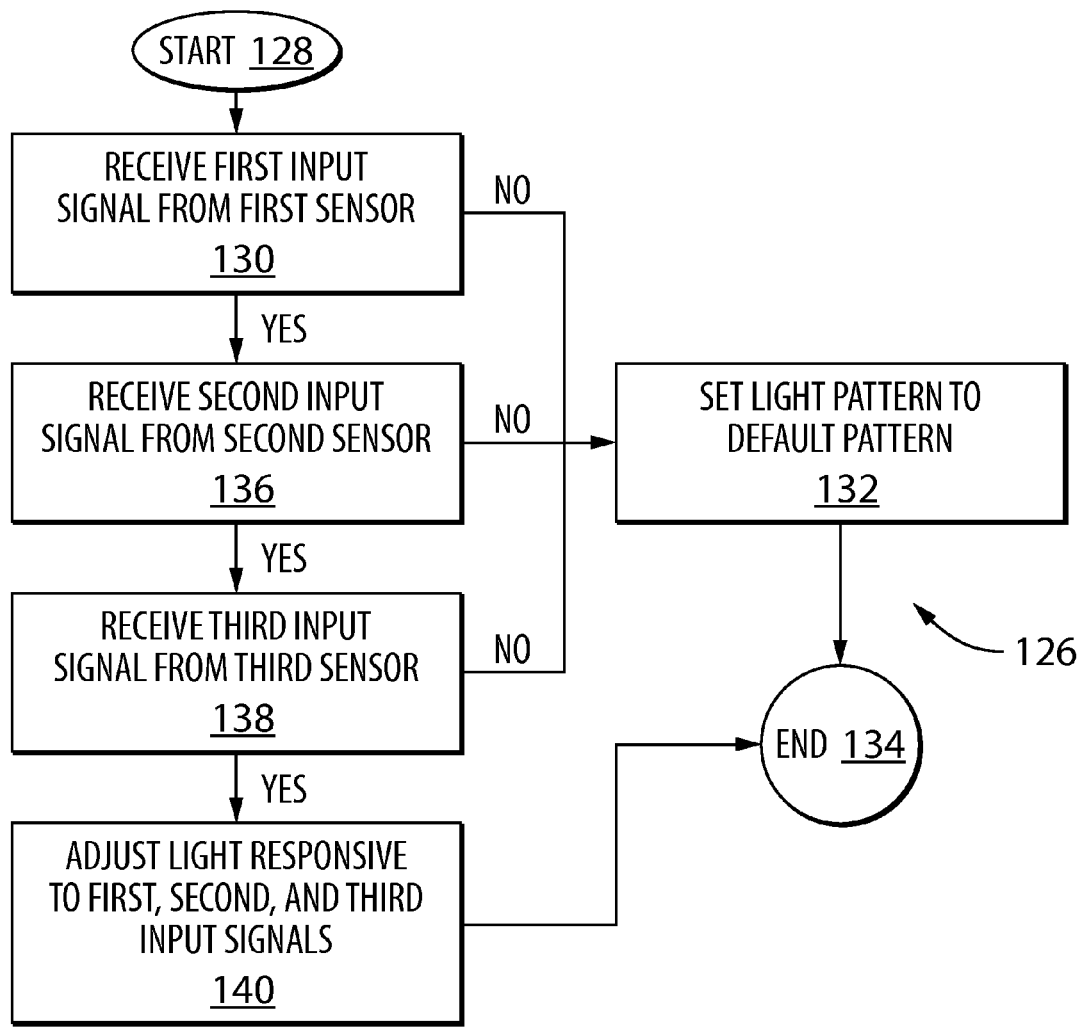
FIG. 16 is a flow chart illustrating a first contemplated method of operation of the lighting system of the present invention.

FIG. 16 is a flow chart illustrating one method 126 of operation of embodiments of the lighting systems 10, 122 of the present invention. It is noted that the lighting method 126 is merely exemplary of innumerable variations that may be appreciated by those skilled in the art. The present invention is intended to encompass those variants, as if disclosed herein.

The method 126 for the lighting system 10, 122 of the present invention contemplates cooperation, inter alia, between the first sensor 94, the second sensor 96, and the third sensor 104. In one embodiment, the controller 100 is contemplated to receive and coordinate signals from each of the three sensors 94, 96, 104 and alter the light generated by the light fixtures 22, 124 based on the inputs from the three sensors 94, 96, 104.

With respect to the first sensor 94, and as noted above, this sensor is provided to detect the position of the seat 14. The first sensor 94 (or seat position sensor 94) senses if the seat is in the TTL position, the napping position, or the berthed position, as well as any other position therebetween.

While the first sensor 94 is illustrated as being located in the seat pan 84, the first sensor 94 may be located on any part of the seat 14 that might assist with the generation of a seat position signal by the first sensor 94. The first sensor 94 may be located in the back rest 86, the leg rest 88, or the legs 90. As should be apparent, therefore, the depiction of the first sensor 94 in the seat pan 84 is not considered to be limiting of the present invention.

Separately, the first sensor 94 may be separate from the seat 14. For example, the first sensor 94 may be located in a bulkhead and measure the position of the seat by detecting one or more attributes, including physical attributes, of the seat 14 in any of its positional orientations.

As also noted, the first sensor 94 may not be a physical device but, instead, may be embodied entirely in an executable software program that is resident on a processor, such as the controller 100. It is contemplated, for example, that the first sensor 94 may be executable code that operates in conjunction with a program providing input to the seat 14. For example, it is contemplated that the seat 14 may be electrically controlled. If so, the position of the seat 14 should be determinable from the input(s) and output(s) received and/or generated to control the position of the seat 14. In such an instance, the first sensor 94 may be embodied, as executable code, within another set of executable instructions.

The second sensor 96 detects the presence of a passenger 82 in the seat 14. Put another way, the second sensor 96 also detects the absence of a passenger 82 from the seat 14. The second sensor 96 generates a signal indicative of the presence and/or absence of the passenger 82 from the seat 14.

As noted above, the second sensor 96 is contemplated to detect a weight of the passenger 82. In other words, the second sensor 96, at least in one contemplated embodiment, is a weight sensor. It is contemplated that the second sensor 96, being a weight sensor, will be positioned within the set pan 84 of the seat 14. As should be apparent to those skilled in the art, however, the second sensor may be located in any other part of the seat 14 without departing from the scope of the present invention.

In a further contemplated embodiment, the second sensor 96 may be separate from the seat 14 but at a location associated with the seat 14 permitting detection of a passenger 84. For example, the second sensor 96 may be adjacent to the seat 14 and detect one or more physical attributes of a passenger 82. In one contemplated embodiment, the second sensor 96 may detect body heat generated by a passenger 84 as a way to determine the presence or absence of a passenger 82 in connection with the seat 14.

Regardless of the type of sensor employed to detect the presence or absence of a passenger 82 in the seat 14, it is contemplated that the second sensor 96 may generate a signal only if the input variables exceed a predetermined threshold. For example, it is contemplated that a passenger 82 might place a book, coat, laptop, or other item on an adjacent seat 14. If so, the second sensor 96 may be constructed so that a second signal indicating the presence of a passenger 82 in the seat 14 will not be generated. In one contemplated example, the second sensor 96 may have a minimum weight threshold before sending a second signal indicating that a passenger 82 occupies the seat 14. Still other control parameters consistent with this approach are contemplated to fall within the scope of the present invention.

With respect to the second sensor 96, a minimum threshold of operation may be of particular interest for the operation of the lighting system 10 of the present invention. In particular, if a passenger 82 were to place a book onto an adjacent seat 14 and the second sensor 96 were to generate a signal indicating that the seat 14 is occupied, if the passenger 82 were to reach into the space above the seat 14, that passenger's hands 108 might be detected by the third sensor 104. This might result in an adjustment of lighting associated with a seat 14 that is not occupied by a passenger 82. To avoid inadvertent activation and/or operation of the lighting system 10 of the present invention, the second sensor 96 is contemplated to be triggered after exceeding a threshold value.

With respect to the second sensor 96, it is possible that this sensor may be embodied entirely in software, just as in the case of the first sensor 94. In a simple example, the second sensor may be an executable code segment that generates a signal indicating the presence of a passenger 82 in the seat 14 in response to input provided from another source. For example, a flight attendant may have an input device that permits entry of a "seat occupied" signal for the seat 14. As such, the second sensor 96 may generate an occupancy signal until the status is altered by the flight crew.

The second sensor 96 is contemplated to detect the presence of a passenger 82 so that functionality associated with the light fixture 22 is available only when the seat 14 is occupied. As such, if a seat 14, 16, 18, 20, 54, 56, 68, 60 is not occupied during flight, lighting functionality is contemplated to be disabled for the unoccupied seat 14, 16, 18, 20, 54, 56, 68, 60. Separately, when a passenger 82 leaves a seat 14 to visit the lavatory, for example, lighting functionality is contemplated to be frozen (or locked) until the passenger 82 returns to his or her seat 14.

Concerning the third sensor 104, this sensor is adapted to detect the location and orientation of the hands 108 of a person in the seat 14.

In the context of the present invention, this third sensor 104 is contemplated to perform one or more functions. First, the third sensor 104 may detect the location of at least one of the hands of the passenger 82 in the seat 14. Second, the third sensor 104 may detect the orientation of the hand 108 of the passenger 82 to determine if the hand 108 is configured to display a particular hand gesture. Third, the third sensor 104 may detect the movement of the hand 108 along any vector. Fourth, the third sensor may generate one or more third signals representative of one or more of the variables detects for the hand 108 of the passenger 82.

The third signal generated by the third sensor 104 is contemplated to provide input to the controller 100 to adjust one or more of the lighting parameters associated with the light source 106. Lighting parameters include, but are not limited to light intensity, light color, light beam direction, light beam size, any pattern projected by the light source 106, and the shape of the projected light pattern, among other lighting parameters. Each of these parameters may be associated with a particular hand gesture.

In one embodiment, it is contemplated that light intensity might be associated with a hand gesture where the passenger 82 extends his or her thumb from his or her fist. If the passenger 82 gives a "thumbs up," this gesture may indicate that the light intensity should be increased. If the passenger 82 gives a "thumbs down," this gesture may indicate that the light intensity should be decreased. As should be apparent, this gesture is merely exemplary of a multitude of hand gestures that may be employed by the system 10 of the present invention.

In another embodiment, it is contemplated that the passenger 82 may combine a hand gesture, i.e., the gesture of a thumb extending from a first (as noted above), with a particular hand motion. In this embodiment, if the passenger 82 displays an extended thumb and moves his or her hand in a starboard direction, this gesture may indicate that the light intensity should be increased. Conversely, if the passenger 82 displays an extended thumb and moves his or her hand in a port direction, this gesture may indicate that the light intensity should be decreased.

As should be apparent, there are literally hundreds or thousands of combinations of hand gestures and hand motions (in three dimensions) that are possible for controlling the lighting parameters for the light generated by the light source 106. Due to the large number of variants, additional examples are not provided. It is noted, however, that hand gestures, hand motions, and combinations of hand gestures and hand motions are contemplated to fall within the scope of the present invention.

FIG. 11 is a flow chart that illustrates a first method 126 according to the present invention.

The method 126 starts at 128.

Following the start at 128, the method 126 proceeds to step 130 where the first input signal is received by the controller 100 from the first sensor 94. As indicated above, the first input signal pertains to the position of the seat 14.

If a first input signal is not received from the first sensor 94, the method 126 proceeds to step 132, where the light pattern generated by the light source 106 is set at least to a default pattern. The default pattern may include a predetermined light intensity, direction, color, and projected pattern, among others. Other default parameters also may be established for the default state of the light source 106.

The default state of the light source 106 is contemplated to be a state where the light source 106 generates a light column 114 of predetermined intensity and size. For example, the default state might include a light intensity and projected light pattern suitable for illumination of a region associated with the seat 14 in the cabin 12 without interfering with other seats 16, 18, 20, 54, 56, 58, 60 in the cabin 12. As should be apparent, there are many possible default states that may be selected as required or as desired.

From step 132, the method 126 ends at step 134.

As should be apparent, the method 126 may be operational in a cyclic manner (i.e., 1 cycle per second or minute, etc.). As such, the method 126 is contemplated to be restarted from step 128 repetitively. This assures that attributes of the light column 114 are regularly updated to accommodate changing input variables. Any cycle time may be selected for operation of the method 126, as required or as desired.

Since the first sensor 94 generates a first sensor signal based on the position of the seat 14, it is contemplated that the first sensor 94 may always generate a first signal. As such, the method 126 may never transition to step 132 from step 130.

If a first input signal is received from the first sensor 94, the method 126 proceeds to step 136. At step 136, the method 126 receives a second input signal from the second sensor 96. In other words, the method 126 looks for a signal associated with a weight of a passenger 82 in the seat 14.

If the controller 100 does not receive a second input signal from the second sensor 96, the method 126 proceeds to step 132, where the controller 100 sets the light pattern to the default condition, which is discussed above.

From step 132, the method 126 ends at step 134.

If the controller 100 receives a second input signal from the second sensor 96, the method 126 proceeds to step 138.

At step 138, the controller 100 looks for receipt of a third input from the third sensor 104. At this step, the method 126 looks for input regarding at least one of the location, orientation, and movement of the hands 108 of the passenger 82.

If the controller 100 does not receive a third input signal from the third sensor 104, the method 126 proceeds to step 128, where the controller 100 sets the light pattern to a default pattern. A failure to receive a third input (after step 136) suggests an error in the lighting system 10, 122, because the system 10, 122 is unable to locate the hands 108 of the passenger 82. At least for this reason, the method 126 is contemplated to return to a default condition.

From step 132, the method 126 ends at step 134.

If the controller 100 receives a third input signal, the method 126 proceeds to step 140.

At step 140, the controller 100 adjusts the light emitted from the light source 106 in response to the first, second, and third input signals. This includes adjusting the intensity, color, projected pattern, location, etc., based on the input signals.

After step 140, the method 126 ends at step 134.

With continued reference to step 140, in connection with the lighting system 10, the controller 100 provides signals to adjust the light generated by the light source 106 for one light fixture 22. In the context of the lighting system 122, the controller 100 provides control signals for two light fixtures 22, 124.

In the context of the lighting system 122, it is contemplated that the controller 100 also may adjust the light columns 114 generated from the light fixtures 22, 124 in a proportional relationship to one another. In one contemplated embodiment, the forward light fixture 22 may provide a brighter illumination than the rear lighting fixture 124 when the seat 14 is in the upright (TTL) position. When the seat 14 transitions to the berthed position, it is contemplated that the illumination from the rear lighting fixture 124 will increase and the light from the front lighting fixture 22 will decrease. As may be apparent, it is contemplated that the total light from the two light fixtures 22, 124 will be maintained within a predetermined range. This means that, for selected positions of the seat 14, the front lighting fixture 22 may contribute a higher intensity of light than the rear light fixture 124. For other positions of the seat 14, the rear lighting fixture 124 may provide a greater degree of light than the front lighting fixture 22.

Not only is it contemplated that the total illumination provided by the lighting fixtures 22, 124 will be divided between the two lighting fixtures 22, 124, it is also contemplated that the lighting fixtures 22, 124 may generate light having different properties. For example, the light from the rear lighting fixture 124 may have a slightly different color (i.e., cool or warm) than the light generated from the front lighting fixture 22. Still further the projected lighting pattern 70, 72, 74, 76, 78, 80 may be different for each lighting fixture 22, 124.

As should be apparent, there are innumerable combinations of light color, intensity, pattern, etc. that may be generated by the light fixtures 22, 124 to provide a suitable environment for the passenger 82. The controller 100 is contemplated to provide illumination based at least upon the input signals received from the three sensors 94, 96, 104. The outputs from the lighting fixtures 22, 124 are contemplated to differ from one another, as determined by the controller 100.

While the method 126 is discussed in the context of the lighting systems 10, 122, it is noted that the method 126 may be applicable in other contexts. For example, as noted above, the lighting system 122 is not limited solely to two light fixtures 22, 124. Any number of light fixtures 22, 124 may be incorporated into the lighting system 124 without departing from the scope of the present invention.

Figure 17:
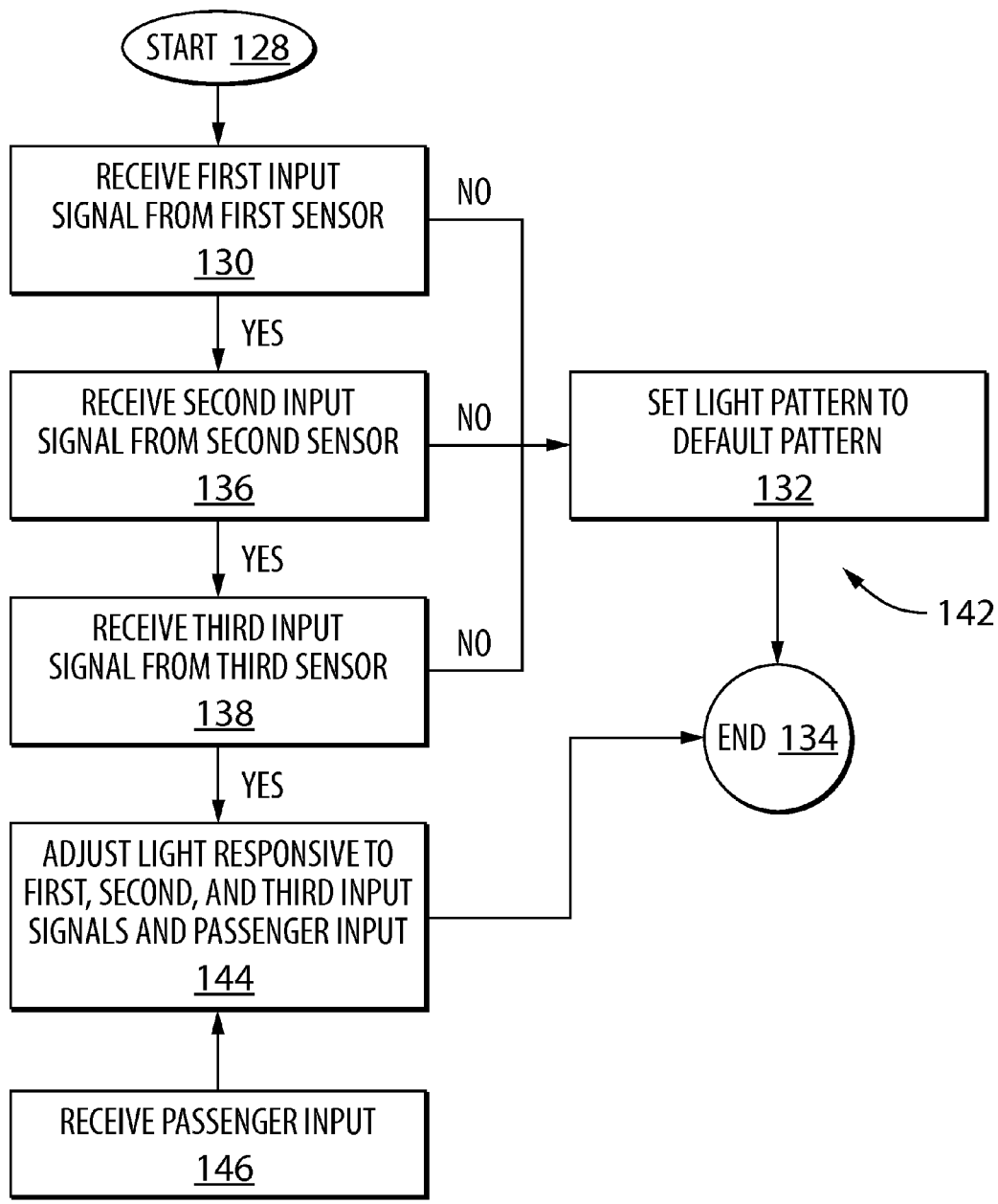
FIG. 17 is a flow chart illustrating a second contemplated method of operation of the lighting system of the present invention.

FIG. 17 illustrates a second method 142 contemplated for operation of the lighting system 10, 122 of the present invention. The second method 142 is the same as the first method 126, except that the second method 142 includes an additional step 146. The second method 142 also includes a modified processing step 144, as shown.

At step 146, the controller 100 receives passenger input from a passenger interface 118. The passenger input is then processed together with the first, second, and third inputs at step 144.

In connection with the lighting systems 10, 122 of the present invention and the method 126, it is noted that the present invention operates to process at least three separate inputs: (1) the first input signal (i.e., the seat position signal), (2) the second input signal (i.e., the passenger presence (or weight) signal), and (3) the third input signal (i.e., at least one of the location, orientation, and movement of the hands 108 of the passenger 82). These three input signals are processed together by the controller 100 to produce an output signal to the light source(s) 106. As noted, the control signal from the controller 100 to the light source(s) 106 provides information to adjust parameters for the light column(s) 114 including, but not limited to, intensity, color, projected pattern, direction, etc.

In connection with the lighting systems 10, 122 of the present invention and the method 142, it is noted that the present invention operates to process at least four separate inputs: (1) the first input signal (i.e., the seat position signal), (2) the second input signal (i.e., the passenger presence (or weight) signal), (3) the third input signal (i.e., at least one of the location, orientation, and movement of the hands 108 of the passenger 82), and (4) the passenger input signal concerning preferences set by the passenger 82. These four input signals are processed together by the controller 100 to produce an output signal to the light source(s) 106. As noted, the control signal from the controller 100 to the light source(s) 106 provides information to adjust parameters for the light column(s) 114 including, but not limited to, intensity, color, projected pattern, direction, etc.

It is contemplated that the operation of the lighting systems 10, 122 and the methods 126, 142 based on at least three input signals (i.e., the method 126) provides sufficient signal confidence to prevent (or at least greatly minimize) aberrant control over the light emitted by the light source(s) 106.

With respect to the controller 100, it is noted that the controller 100 may be dedicated to the systems 10, 122 of the present invention. Alternatively, the controller 100 may be embodied in other systems present in the aircraft. In other words, the controller 100 need not be dedicated solely to the systems 10, 122 of the present invention.

Figure 18:
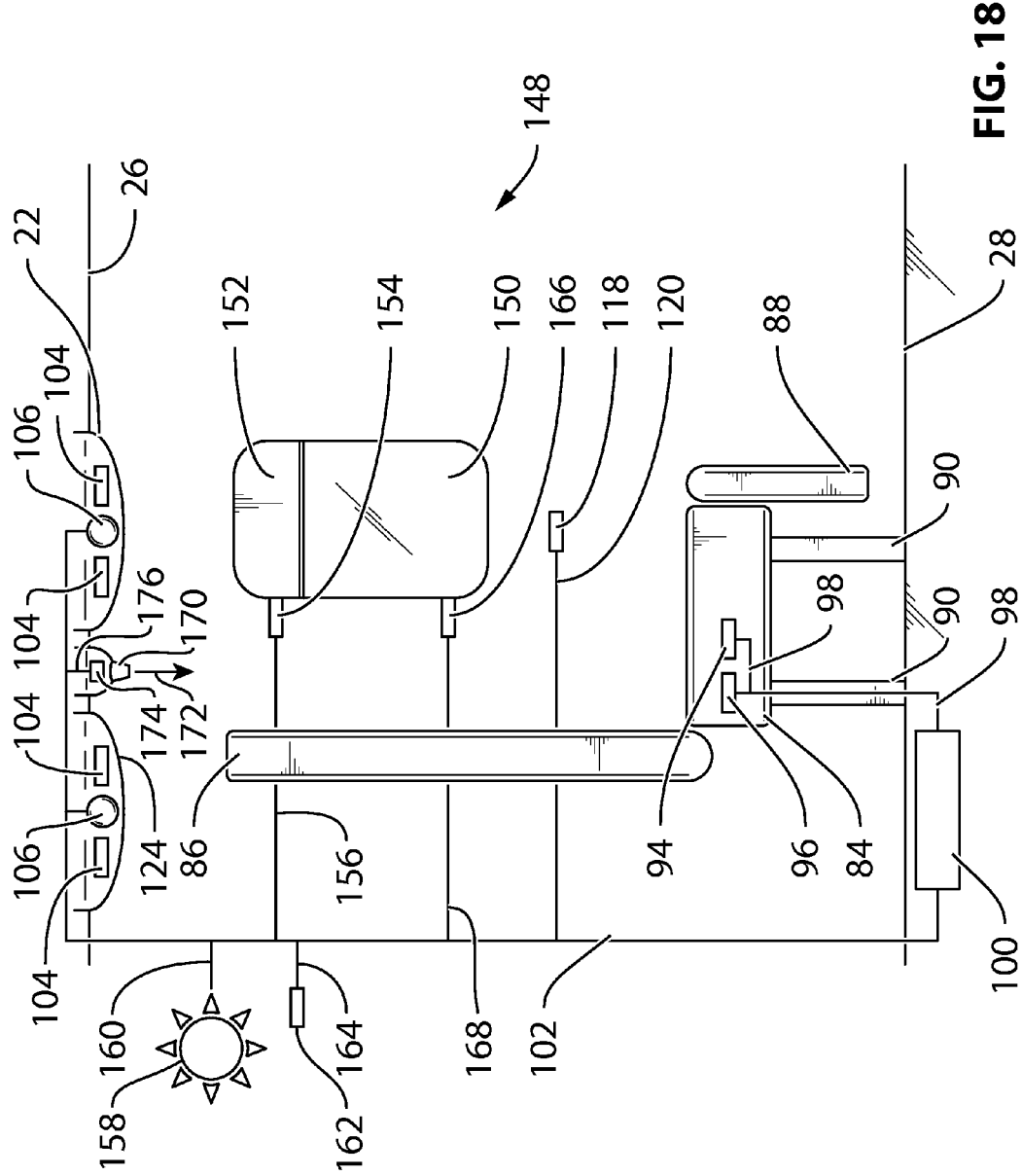
FIG. 18 is a graphical side view of a passenger service system, which optionally provides control over additional comfort features including cabin lighting, air nozzle direction, air nozzle flow rate, and the degree of openness of one or more window shades.

FIG. 18 illustrates a third embodiment of an embodiment of a passenger service system 148. The passenger service system 148 provides control for passenger services, including lighting. As will be made apparent from the discussion that follows, the passenger service system 148 provides functionality in addition to the functionality made available by the lighting systems 10, 122 described above.

The passenger service system 148 is contemplated to include many of the features described in connection with the lighting system 122. In this embodiment of the passenger service system 148, the controller 100 receives input in addition to that received by the lighting system 122 and provides additional control signals to refine management of several comfort-related parameters within the cabin 12 of the aircraft.

As illustrated in FIG. 18, the cabin 12 includes at least one window 150 with a window shade 152. The window 150 is positioned adjacent to the seat 14, as might be expected for a typical layout of a cabin 12 for an aircraft. The window shade 152 may be a physical shade (i.e., a light-impermeable flexible material) that blocks the transmission of light through the window 150. Alternatively, the window shade 152 may be an electrochromic material (i.e., an electrochromic) film that alters the transmission of light through the window 150 by responding to an electrical signal applied thereto. Other types of window shades 152 also may be employed without departing from the scope of the present invention.

A fourth sensor 154 is associated with the window shade 152. The fourth sensor 154 is contemplated to generate a signal that indicates the degree of openness for the window shade 152. For example, if the window shade is only open to reveal 10% of the window 150, the signal generated that the fourth sensor 154 will reflect this degree of openness for the window shade 152. Given the operational nature of the fourth sensor 154, this sensor also is referred to as the window shade sensor 154.

As should be apparent to those skilled in the art, the window shade sensor 154 may measure the degree to which the window shade 152 is closed. This is merely a measurement of the opposite parameter to the degree of openness of the window shade 152. The present invention is intended to encompass either variant. Still other variants, as should be apparent to those skilled in the art, are intended to be encompassed hereby.

As shown in FIG. 18, the fourth sensor 154 is connected to the controller 100 via a communication line 156.

Separately, it is contemplated that the window shade sensor 154 may be embedded entirely in software. In this variant, the controller 100 may record the degree of openness of the window shade 152 based on signals previously provided from the controller 100 with regard to the amount that the window shade 152 is open (or to the degree to which the electrochromic material has been adjusted to reduce the amount of light passing through the window 150). If the window shade sensor 154 is embedded in software, it is contemplated that a physical sensor 154 may not be required for operation of the passenger service system 148.

As also illustrated in FIG. 18, the cabin is contemplated to include one or more cabin lights 158 that are connected to the controller 100 via a communication line 160. The cabin lights 158 are contemplated to differ from the light provided by the light fixtures 22, 124 in that the light from the cabin lights 158 is of a more general (or diffused) nature. The light fixtures 22, 124 are contemplated to provide specific, task lighting (including light for reading) for the passengers 82. The cabin light 158 is contemplated to provide general illumination within the cabin 12 of the aircraft.

It is contemplated that control over the cabin lights 158 will be provided, at least in part, by the controller 100. Since the cabin lights 158 are contemplated to be LEDs, the controller 100 may adjust aspects of the light including its intensity and color, as required or as desired. It is noted that the cabin lights 158 may be actuated in regions or zones within the aircraft and should not be understood to refer to lighting within the entire cabin 12 of the aircraft.

Associated with the cabin lights 158 is a fifth sensor 162 that connects to the controller 100 via a communication line 164. The fifth sensor 162 is contemplated to be provided to measure the level of light generated by the cabin lights 158 and provide a cabin light signal to the controller 100. For this reason, the fifth sensor 162 also is referred to as a cabin lights sensor 162. Based at least in part on the input provided by the fifth sensor 162, the intensity of the cabin lights 158 may be adjusted by the controller 100 to provide suitable, general illumination within the cabin 12 of the aircraft.

As with the other sensors described herein, it is contemplated that the cabin light sensor 162 may be implemented solely as software. In particular, it is contemplated that the controller 100 will be able to discern the level of lighting within the cabin 12 of the aircraft based on the signals provided to the cabin lights 158. More specifically, the controller 100 may be provided with software to determine the level of light intensity generated by the cabin lights 158 based on the voltage applied thereto, for example.

It is also contemplated that the cabin 12 of the aircraft may include a sixth sensor 166 that connects to the controller 100 via a communication line 168. The sixth sensor 166 is contemplated to measure the amount of ambient light in the cabin 12 near to the passenger 82. As such, the sixth sensor 166 also is referred to as an ambient light sensor 166.

The ambient light sensor 166 is contemplated to be provided near to the passenger 82 to measure the intensity and color of the light in the vicinity of the passenger 82, among other parameters of interest. The intensity and color of light in the vicinity of the passenger 82 (among other parameters) are anticipated to be influenced by the light generated from the cabin lights 158, the light generated by the light fixtures 22, 124, the light entering the cabin 12 through the window 150, and other sources as should be apparent to those skilled in the art.

The ambient light sensor 166 is contemplated to for the passenger service system 148 to provide input to the controller 100 so that optimal lighting conditions may be maintained within the cabin 12 of the aircraft. In this context, it is contemplated that the fourth sensor 154 and the fifth sensor 162 may not provide adequate information to the controller 100 for proper control over the conditions within the cabin. For example, it is contemplated that, if the aircraft is flying during the day, sunlight will enter through the window 150. Knowing the degree of openness of the window shade 152 or the intensity of the lights 158, 22, 124 does not necessarily provide a complete picture with respect to the lighting within the cabin 12 of the aircraft. The ambient light sensor 166 is contemplated to provide the type of information to provide additional control options to the controller 100.

As also illustrated in FIG. 18, the cabin 12 includes an air nozzle 170 to direct an air flow in an air flow direction 172 with respect to the seat 14. A seventh sensor 174 is provided in connection with the air nozzle 170 to provide information to the controller 100 regarding at least one of an air flow rate and an air flow direction. The seventh sensor 174 communicates with the controller via a communication line 176, which connects to the communication line 102.

In connection with the air nozzle 170, the air flow direction 172, and the air flow rate, it is noted that each of these variables concern what is more generally referred to as the "air supply" provided within the cabin 12 of the aircraft. To avoid limiting the present invention solely to air provided via an air nozzle 170, the term "air supply" is used herein to encompass any structure, hardware, and/or software that may be employed to supply air within the cabin 12 of the aircraft. The air nozzle 170, therefore, represents one specific implementation by which air may be supplied within the cabin 12 of the aircraft.

In one contemplated embodiment, the seventh sensor 174 is a physical sensor (or combination of several sensors) that are disposed in or near to the air nozzle 170. In another contemplated embodiment, the seventh sensor 174 is embodied in software, at least in part. In this second embodiment, the controller 100 may retain information concerning the direction and/or flow rate for the air nozzle 170. If so, a physical sensor 174 may not be required.

With continued reference to FIG. 18, in the passenger service system 148, the controller 100 is contemplated to be provided with control over a number of lighting features, air flow rate through the air nozzle 170, and air flow direction 172. The lighting and air flow parameters are collectively referred to as "comfort parameters" or "passenger services" with respect to this embodiment. The controller 100 is contemplated to control the comfort parameters (or passenger services) in response to receipt of signals from the first through seventh sensors 94, 96, 104, 154, 162, 166, 174 disposed within the cabin 12 of the aircraft.

As discussed in connection with the lighting systems 10, 122, the controller 100 is contemplated to rely upon three basic signals, which are provided by the first sensor 94 (seat position sensor), the second sensor 96 (weight sensor), and the third sensor 104 (hand sensor). The passenger service system 148 described in connection with FIG. 18 includes a controller 100 that also may rely on any one of the signals generated from the fourth sensor 154 (window shade sensor), the fifth sensor 162 (cabin light sensor), the sixth sensor 166 (ambient light sensor), and the seventh sensor 174 (air nozzle direction/flow rate).

Concerning the three basic signals, which are provided by the first sensor 94 (seat position sensor), the second sensor 96 (weight sensor), and the third sensor 104 (hand sensor), the three input signals has been described in connection with separate sensors 94, 96, 104. It is noted, however, that the present invention is not limited solely to embodiments where the three sensors 94, 96, 104 are separate from one another. It is contemplated that the three sensors 94, 96, 104 or two of the three sensors 94, 96, 104 may be embodied in a single device.

Similarly, the four additional signals, which are generated from the fourth sensor 154 (window shade sensor), the fifth sensor 162 (cabin light sensor), the sixth sensor 166 (ambient light sensor), and the seventh sensor 174 (air nozzle direction/flow rate), need not be generated by four separate sensors 154, 162, 166, 174 that are independent from one another. To the contrary, the present invention contemplates that one or more of the sensors 154, 162, 166, 174 may be combined together into a single device.

Still further, it is contemplated that the seven sensors 94, 96, 104, 154, 162, 166, 174 may be combined in any manner that may be deemed suitable for a particular cabin 12. Specifically, one or more of the sensors 94, 96, 104, 154, 162, 166, 174 may be combined in any arrangement as appropriate for the aircraft. These variations are contemplated to fall within the scope of the present invention.

While the operation of the passenger service system 148 will be discussed in greater detail with respect to the methods illustrated in FIGS. 19 and 20, a general overview of the operation of the passenger service system 148 is provided in the paragraphs that follow.

The passenger service system 148 is contemplated to detect the presence of a passenger 82 and to generate a comfortable environment for the passenger 82 in the seat 14. To do this, the controller 100 may adjust the operation of one or more of the overhead light fixtures 22, 124, the cabin lights 158, the window shade 152, and the air nozzle 170. The seven sensors 94, 96, 104, 154, 162, 166, 174 provide input for this operation.

In one possible example, the aircraft is in operation during daytime hours. The controller 100 recognizes that light is entering through the window 150 and automatically adjusts the degree of openness of the window shade 152 to reduce the amount of light passing through the window 150. Simultaneously, the controller may increase the intensity of the light from the light fixtures 22, 124. At the same time, the controller may reduce the ambient light in the cabin 12 by dimming the cabin lights 158.

In a second possible example, the passenger 82 may have reclined his or her seat to the berthed orientation to take a nap during the flight. If so, the controller 100 is contemplated to automatically establish and maintain a suitable environment conducive to sleep. As such, the ambient lighting in the cabin 12 may be discontinued. Also, the overhead lights 22, 124 may be turned off. At the same time, the window shade 152 may be closed.

As noted above, the controller 100 responds to the second sensor 96, which detects the seat position. It is contemplated that the direction of the air nozzle 170 may be adjusted automatically as the passenger 82 alters the seat position. With such an operation, it is contemplated that the air nozzle 170 will "follow" the passenger 82 as the seat 14 transitions from the TTL position to the berthed position.

It is noted that the present invention is not limited to the comfort parameters associated with only one seat 14 in the cabin 12 of the aircraft. It is contemplated that the controller 100 may adjust comfort parameters with respect to the entire cabin 12, taking into account the comfort parameters for each individual passenger 82. In other words, the controller 100 may adjust all of the comfort parameters for all of the passengers 82, taking into account how changes made by one passenger 82 affect the comfort of other passengers 82 in the cabin 12 of the aircraft.

Figure 19:
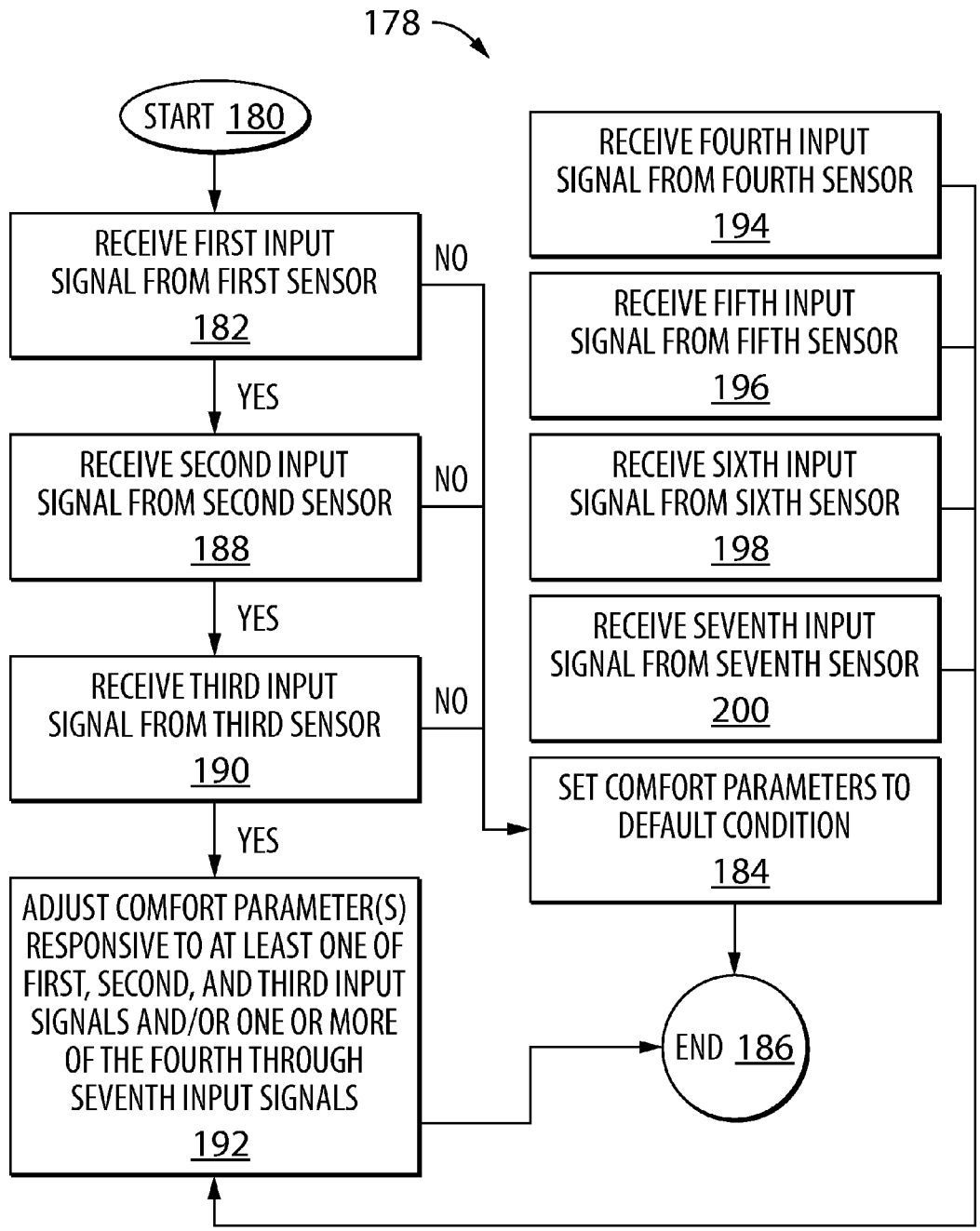
FIG. 19 is a flow chart illustrating a third contemplated method of operation of the passenger service system of the present invention, as illustrated in FIG. 18.

With these examples provided, reference is now made to the third method 178 illustrated in FIG. 19. This third method 178 is contemplated to be a variation of the first method 126 illustrated in FIG. 16.

As in the first method 126, the third method 178 starts at step 180.

The method proceeds to step 182, where the method 178 receives a first input signal from the first sensor 94. As noted above, the first signal concerns a position of the seat 14. If the method 178 does not receive a first input signal, the method 178 proceeds to step 184, where the method 178 causes the controller 100 to set comfort parameters to a default condition. It is contemplated that a first input signal will not be received if, for example, the seat 14 is in the upright, TTL position.

The third method 178 ends at step 186.

If the third method 178 receives the first input signal, the third method 178 proceeds from step 182 to step 188. At step 188, the method 178 receives a second input signal from the second sensor 96. As noted above, the second sensor 96 detects the presence of a passenger 82 in the seat 14 via, in one contemplated embodiment, a detection of a weight of the passenger 82.

If the third method 178 does not receive a second input signal from the second sensor 96, the method 178 proceeds to step 184. As discussed above, at step 184, the method 178 sets the comfort parameters to a default condition. If the method 178 receives a second input signal from the second sensor 96 at step 188, the method proceeds to step 190.

At step 190, the method 178 receives a third input signal from the third sensor 104. As noted above, the third input signals encompasses, among other things, the location and orientation of the hands 108 of the passenger 82.

If the method 178 does not receive a third input signal, the method 178 proceeds to step 184 where the method 178 sets the comfort parameters to a default condition. If the method receives a third input signal at step 190, the method 178 proceeds to step 192.

At step 192, the method 178 adjusts the comfort parameters in response to the first, second, and third input signals. In addition, at step 192, the method 178 may adjust the comfort parameters based on receipt of additional input signals.

As illustrated in FIG. 19, at step 194, the method 178 optionally may receive a fourth input signal from the fourth sensor 154. As discussed above, the fourth sensor 154 detects the openness of the window shad 152 associated with the window 150 adjacent to the seat 14 of the passenger 82.

In addition, at step 196, the method 178 optionally may receive a fifth input signal from a fifth sensor 162. The fifth sensor 152 detects the cabin light provided by the cabin lights 158.

At step 198, the method 178 optionally receives a sixth input signal from a sixth sensor 166. The sixth sensor 166 detects the ambient light within the cabin 12 of the aircraft.

At step 200, the method 178 optionally receives a seventh input signal from a seventh sensor 174. The seventh sensor 174 detects the rate of air flow through the air nozzle 170. The seventh sensor 174 also may detect the air flow direction 172 of the air from the air nozzle 170.

At step 192, the third method 178 also may take into account one or more of the fourth input signal, the fifth input signal, the sixth input signal, and the seventh input signal. The method 178 adjusts the comfort parameters in the cabin 12 of the aircraft based on the first input signal, the second input signal, and the third input signal and also based on one or more of the fourth input signal, the fifth input signal, the sixth input signal, and the seventh input signal.

As may be apparent from the foregoing, it is contemplated that, with respect to the third method 178, the first input signal, the second input signal, and the third input signal will always be accommodated in the adjustment made at step 192. The third method 178 optionally takes into account one or more of the fourth input signal, the fifth input signal, the sixth input signal, and the seventh input signal.

After step 192, the third method 178 proceeds to the end 186.

As with the first method 126 illustrated in FIG. 16 and the second method 142 illustrated in FIG. 17, it is contemplated that the third method 178 will be repeated in a cyclic manner. In other words, the method 178 is contemplated to repeat according to a predetermined time interval to accommodate changes in any of the seven input signals over a period of time.

Figure 20:
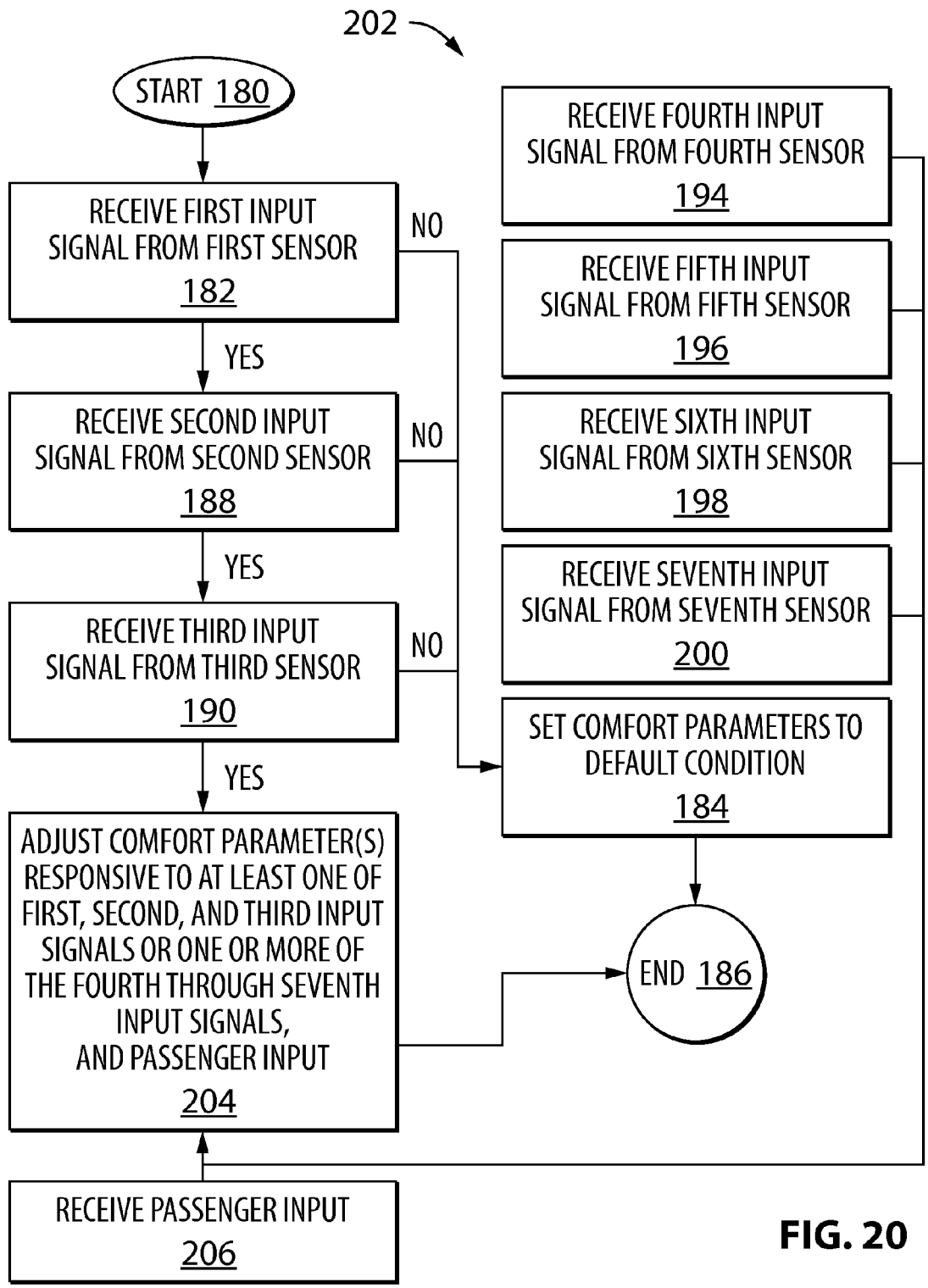
FIG. 20 is a flow chart illustrating a fourth contemplated method of operation of the passenger service system of the present invention, as illustrated in FIG. 18.

FIG. 20 illustrates a fourth method 202 according to the present invention. The fourth method 202 is a variation of the third method 178 illustrated in FIG. 19.

The fourth method 202 differs from the third method 178 in that the fourth method 202 includes the step 206, whereby the fourth method 202 receives input from the passenger 82. If so, at the step 204, the fourth method 202 also takes into account the input received from the passenger 82. In all other ways, the fourth method 202 is the same as the third method 178.

Figure 21:
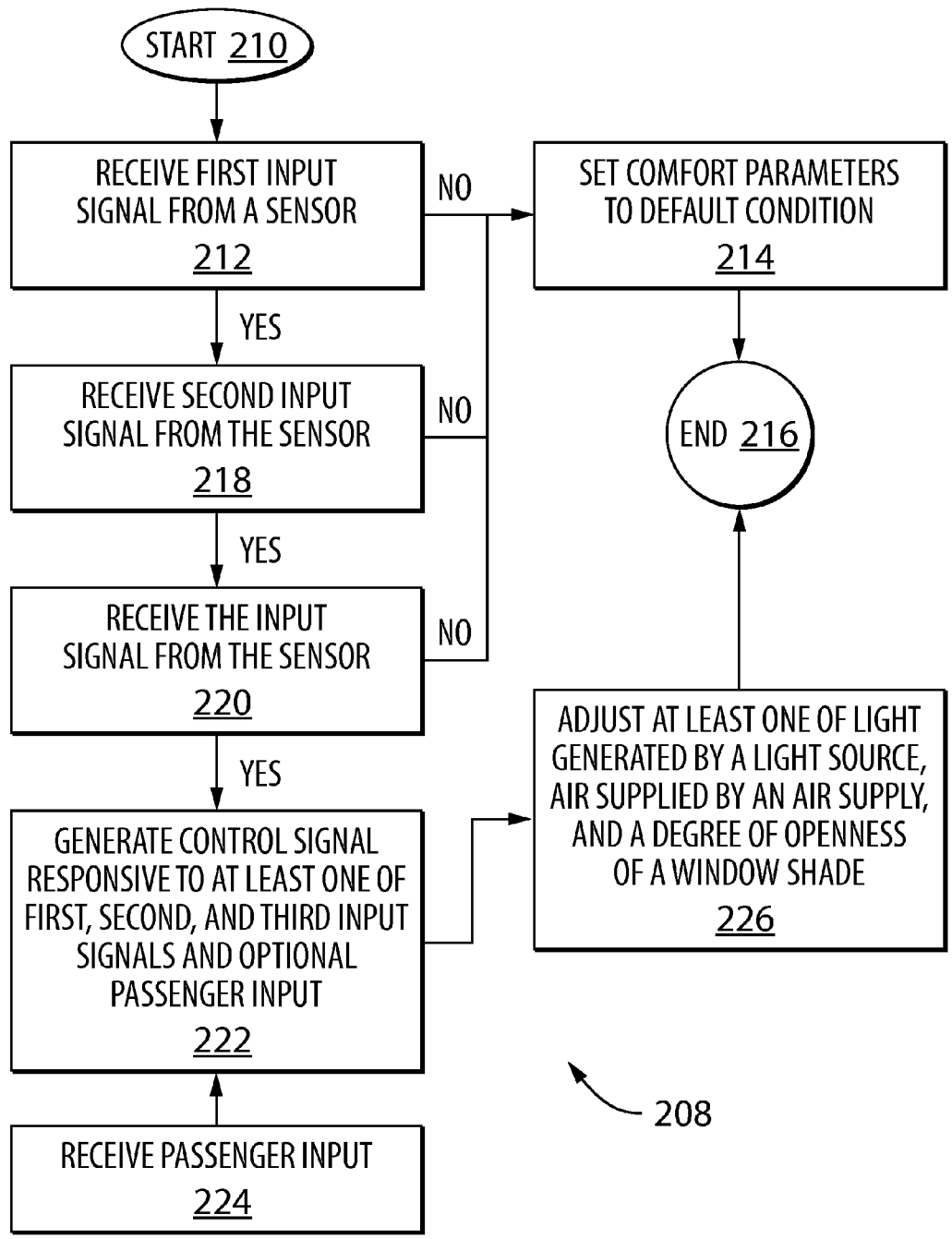
FIG. 21 is a flow chart illustrating a fifth contemplated method of operation of the passenger service system of the present invention, as illustrated in FIG. 18.

FIG. 21 is a flow chart illustrating a fifth contemplated method 208 of operation of the passenger service system 148 according to the present invention. In this fifth contemplated method, the sensors 94, 96, 104 are combined into a single sensor that is placed near to the passenger 82 within the cabin 12 of the aircraft. For example, it is contemplated that the sensor that provides the first, second, and third input signals may be disposed above the seat 14 occupied by the passenger 82. Also, the operation of the passenger service system 148 is contemplated to be driven by at least one of the first, second, and third input signals received from the sensor. As discussed above, the controller 100 is understood to control comfort parameters that encompass one or more of the light generated by the light fixtures 22, 124 (including light intensity, color, projected pattern, etc.), the cabin lights 158, the operation of the window shade 152, and the air nozzle 170 (including the air direction 172 and the air flow rate).

The method 208 starts at step 210.

The method 208 continues to step 212, where the method receives a first input signal from the sensor. As discussed above, the first input signal is contemplated to be received by the controller 100. As also discussed above, the first input signal concerns the position of the seat 14 between the TTL position and the berthed position.

If the method 208 does not receive a first input signal at step 210, the method 208 proceeds to step 214, where the comfort parameters controllable within the cabin 12 of the aircraft are set to a default condition.

From step 214, the method proceeds to the end at 216.

If the method 208 receives a first input signal at step 212, the method 208 proceeds to step 218, where the method 208 receives the second input signal from the sensor concerning the presence of a passenger 82 in the seat 14. As before, it is contemplated that the second input signal is received from the sensor by the controller 100.

If the method 208 does not receive the second input signal, the method 208 proceeds to step 214, where the comfort parameters controllable within the cabin 12 of the aircraft are set to a default condition.

From step 214, the method 208 proceeds to the end at 216.

If the method 208 receives a second input signal at step 218, the method proceeds to step 220, where the method 208 receives the third input signal concerning the hands 108 of the passenger 82 in the seat 14. As before, it is contemplated that the third input signal is received by the controller 100 from the sensor. The third input signal concerns at least one of the position, orientation, and direction of movement of the hands 108 of the passenger 82.

If the method 208 does not receive the third input signal at step 220, the method 208 proceeds to step 214, where the comfort parameters controllable within the cabin 12 of the aircraft are set to a default condition.

It is noted that, while the steps 212, 218, 220 are illustrated as being performed in series, these steps may be performed in parallel without departing from the scope of the present invention. Also, only one or two of the three steps 212, 218, 220 may be performed without departing from the scope of the present invention.

From step 214, the method 208 proceeds to the end at 216.

If the method 208 receives the third input signal at step 220, the method proceeds to step 222.

Before discussing step 222, it is noted that the method 208 also may receive additional input from the passenger 82 via a passenger input device 118. The passenger input is received at step 224. If the passenger provides passenger input at step 224, that passenger input signal is received by the controller 100 and is processed together with at least one of the first, second, and third input signals received at steps 212, 218, 220.

At step 222, the method processes the first, second, and third input signals and, optionally, the passenger input signal, and generates a control signal responsive to the selected input signals.

The method 208 proceeds from step 222 to step 226. At step 226, the method (via the controller 100) adjusts at least one of light generated by a light source 106, air supplied by an air supply (e.g., an air nozzle 170), and a degree of openness of a window shade 152.

From step 226, the method 208 proceeds to the end at 216.

As with the other methods described herein, it is contemplated that the method 208 will be cycled at predetermined time intervals so that the comfort parameters within the cabin 12 of the aircraft may be updated periodically.

The method 208 may be varied to respond optionally to any of the fourth input signals, the fifth input signals, the sixth input signals, and the seventh input signals described above.

Figure 22:
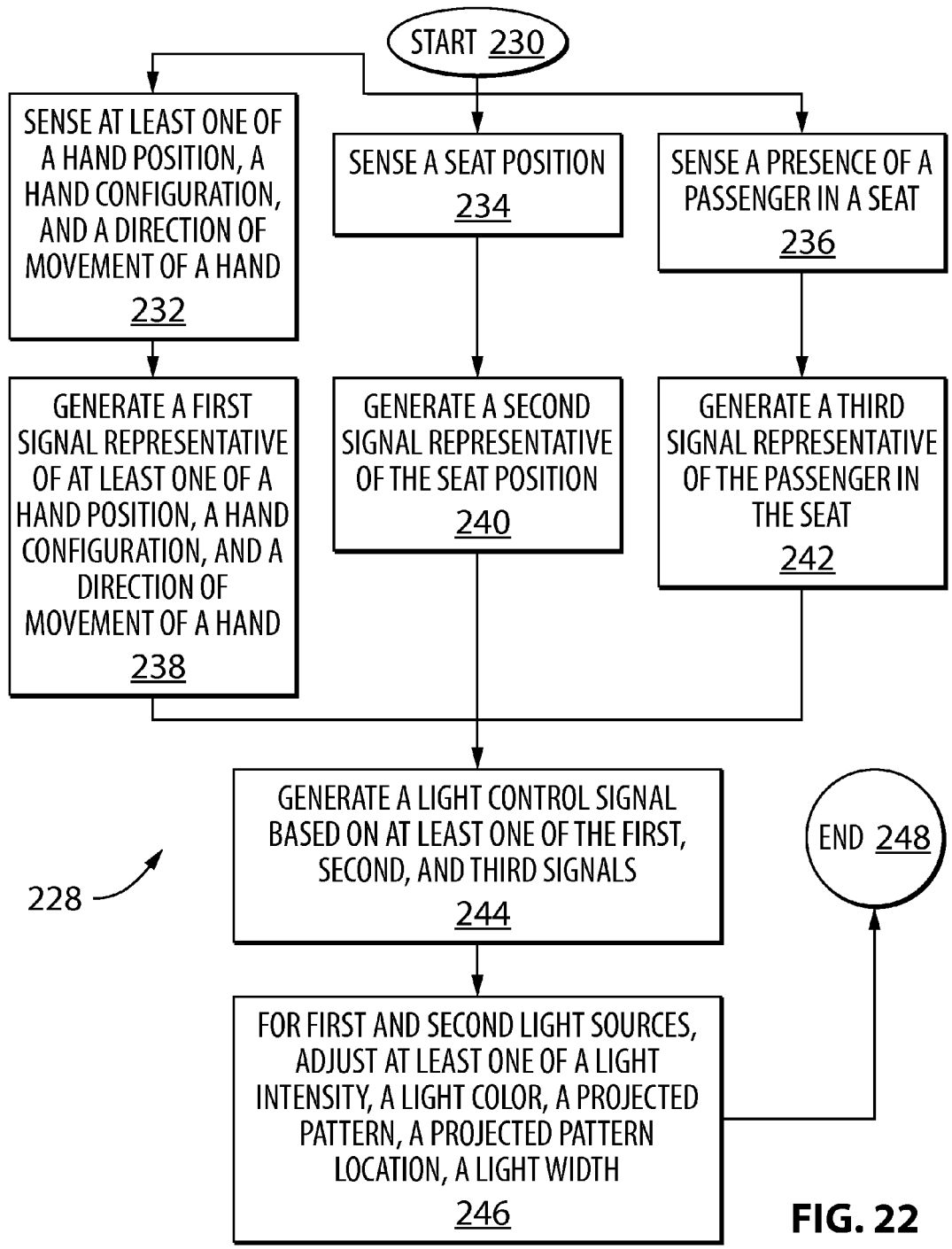
FIG. 22 is a flow chart illustrating a sixth contemplated method of operation of the passenger service system of the present invention, as illustrated in FIG. 18.

FIG. 22 is a flow chart illustrating a sixth contemplated method 228 of operation for the passenger service system 148 of the present invention. Similar to the fifth method 208 illustrated in FIG. 21, the sixth method 228 is contemplated to respond to the first, second, and third input signals. In this sixth method 228, however, the focus is directed to control over the light fixtures 22, 124 that are positioned in front of and behind the seat 14 in the cabin 12 of the aircraft.

As noted above, one aspect of the present invention concerns proportional (or balanced) control between the two (or more) light fixtures 22, 124 to provide optimal lighting conditions for the passenger 82 in the seat 14. While two light fixtures 22, 124 are the focus of this embodiment, it is noted that a larger number of light fixtures 22, 124 may be employed without departing from the scope of the present invention.

The method 228 starts at 230.

From 230, the method 228 proceeds to three sensing step 232, 234, 236 where the sensor detects three basic variables within the cabin 12 of the aircraft. In particular, at step 232, the method 228 senses at least one of a hand position, a hand configuration, and a direction of movement of at least one hand 108 of the passenger 82. At step 234, the method 228 senses a position of the seat 14. At step 236, the method 228 senses the presence of a passenger 82 in the seat 14.

For each of the steps 232, 234, 236, sensing may be effectuated by separate sensors 94, 96, 104. Alternatively, all three sensors 94, 96, 104 may be combined into a single sensor that is strategically positioned near to the passenger 82 within the seat 14. Other variations for the sensor(s) also are contemplated to fall within the scope of the present invention.

The method 228 proceeds from steps 232, 234, 236 to steps 238, 240, 242. Step 238 follows step 232. Step 240 follows step 234. Step 242 follows step 236.

At step 238, the method 228 generates a first signal representative of at least one of a hand position, a hand configuration, and a direction of movement of at least one hand 108 of a passenger 82. This first signal is akin to the first input signal discussed above.

At step 240, the method 228 generates a second signal representative of the seat position. The position of the set 14 may be between the TTL position (or full upright position) and the berthed position. This second signal is akin to the second input signal discussed above.

At step 242, the method 228 generates a third signal representative of the presence of the passenger 82 in the seat 14. This third signal is akin to the third input signal discussed above.

The sensing at steps 232, 234, 236 and the generation of the first, second, and third input signals at steps 238, 240, 242 are contemplated to be performed via the sensor (or multiple sensors) as discussed hereinbefore.

It is noted that, while the steps 232, 234, 236 and 238, 240, 242 are illustrated as being performed in parallel, these steps may be performed in series without departing from the scope of the present invention. Also, only one or two of the three steps 232, 234, 236 may be performed without departing from the scope of the present invention.

At step 244, the first, second, and third input signals are received by the controller 100, which generates a light control signal.

At step 246, the light control signal is provided to the first light fixture 22 and the second light fixture 124. At step 246, the method 228 adjusts at least one of a light intensity, a light color, a projected pattern, a projected pattern location, and a light width generated in connection with the first and second light fixtures 22, 124.

At step 246, it is contemplated that the light control signal provided by the controller 100 will control the light fixtures 22, 124 proportionately with respect to one another. In other words, the light generated by the light fixtures 22, 124 is contemplated to be balanced such that optimal lighting conditions are provided for the passenger 82, taking into account variables such as the location of the hands 108 of the passenger 82, the position of the seat 14, etc.

The method 228 ends at 248.

As with the other methods described above, the method 228 is contemplated to be repeated in a cyclic manner so that the light control signal may be adjusted periodically. The predetermined time interval of this cycle may be measured in millisecond, seconds, minutes, etc., as required or as desired.

As may be apparent, reference to any one sensor or feature herein does not preclude more than one of the enumerated devices being used within the cabin 12 of the aircraft. For example, it is contemplated that the cabin light sensor 162 will be implemented as a plurality of cabin light sensors 162 disposed throughout the cabin 12 of the aircraft. The cabin light sensors 162 are understood to cooperate with one another to provide suitable lighting within the cabin 12 of the aircraft.

As also may be apparent from the foregoing, reference to communication lines 98, 102, 120, 156, 160, 164, 168, 176 is contemplated to refer to wired and/or wireless communication channels to and from the controller 100. In addition, the communication lines 98, 102, 120, 156, 160, 164, 168, 176 are contemplated to be two-way communication channels. Naturally, multiple one-way communication channels may be employed without departing from the scope of the present invention. In addition, a communication bus or a signal bus may be employed without departing from the scope of the present invention.

As noted above, the present invention has been described in connection with several embodiments and variations. The present invention is not intended to be limited to any one particular embodiment or to any one particular feature described herein. To the contrary, there are numerous variations and equivalents that those skilled in the art would appreciate in connection with the present invention. Those variations and equivalents are intended to be encompassed by the present invention.

What is claimed is:

1. A passenger service system, comprising:
   a seat;
   a first sensor associated with the seat, wherein the first sensor senses a position of the seat and generates a first signal representative of the position of the seat;
   a second sensor associated with the seat, wherein the second sensor is adapted to sense the presence of a passenger in the seat and generates a second signal representative of the presence of the passenger in the seat;
   a first light source disposed at a predetermined location with respect to the seat, wherein the first light source generates light within a first light source column region;
   a third sensor associated with the first light source, wherein the third sensor is adapted to sense at least a position of at least one hand of the passenger within a hand sensing column region and generate a third signal representative of the at least one hand of the passenger; and
   a controller operatively connected to the first sensor, the second sensor, and the third sensor to receive the first signal, the second signal, and the third signal and generate a first light signal, to be received by the first light source, where the first light signal controls at least one parameter associated with the light including at least one of an intensity, a color, a projected pattern, projected pattern location, or a width,
   wherein the first light source column region is directed towards the hand sensing column region.

2. The passenger service system of claim 1, further comprising:
   a passenger input device, the passenger input device generating a passenger input signal from the passenger as to the at least one parameter,
   wherein the controller controls the at least one parameter based on the passenger input signal.

3. The passenger service system of claim 1, wherein the second sensor is adapted to sense a weight of the passenger in the seat.

4. The passenger service system of claim 1, wherein the third sensor is adapted to sense at least one of an orientation of the at least one hand of the passenger and a direction of movement of the at least one hand of the passenger.

5. The passenger service system of claim 1, further comprising a fourth sensor associated with a window shade,
   wherein the fourth sensor senses a degree of openness of the window shade and generates a fourth input signal,
   wherein the controller is operatively connected to the fourth sensor to receive the fourth input signal, and
   wherein the controller further controls at least one parameter associated with the degree of openness of the window shade also based on the fourth input signal.

6. The passenger service system of claim 1, further comprising a fifth sensor associated with a cabin light,
   wherein the fifth sensor senses the cabin light and generates a fifth input signal,
   wherein the controller is operatively connected to the fifth sensor to receive the fifth input signal, and
   wherein the controller further controls at least one parameter associated with the cabin light also based on the fifth input signal.

7. The passenger service system of claim 1, further comprising a sixth sensor associated with an ambient light,
   wherein the sixth sensor senses the ambient light and generates a sixth input signal,
   wherein the controller is operatively connected to the sixth sensor to receive the sixth input signal, and
   wherein the controller further controls at least one parameter associated with the ambient light also based on the sixth input signal.

8. The passenger service system of claim 1, further comprising a seventh sensor associated with an air supply,
   wherein the seventh sensor senses at least one of an air flow direction and an air flow rate and generates a seventh input signal,
   wherein the controller is operatively connected to the seventh sensor to receive the seventh input signal, and
   wherein the controller further controls at least one parameter associated with the at least one of an air flow direction and an air flow rate also based on the seventh input signal.

9. The passenger service system of claim 8, wherein the air supply comprises an air nozzle.

10. The passenger service system of claim 1, wherein the first light source comprises at least one light emitting diode.

11. The passenger service system of claim 1, further comprising:
    a second light source disposed at a predetermined location with respect to the seat,
    wherein the second light source generates light, and
    wherein the controller generates a second light signal, to be received by the second light source, where the second light signal controls at least one parameter associated with the light including at least one of an intensity, a color, a projected pattern, projected pattern location, or a width.

12. The passenger service system of claim 11, wherein the second light source comprises at least one light emitting diode.

13. The passenger service system of claim 11, wherein the first light signal includes the same information as the second light signal.

14. The passenger service system of claim 11, wherein the controller balances the first light signal and the second light signal with respect to one another, thereby providing proportional control over the first light source and the second light source to produce a consistent combined lighting effect.

15. A method of operation of a passenger service system, comprising:
   receiving, by a controller, a first input signal from a first sensor, wherein the first input signal concerns at least a position of a seat adapted to receive a passenger therein;
   receiving, by the controller, a second input signal from a second sensor, wherein the second input signal concerns at least a presence of the passenger in the seat;
   receiving, by the controller, a third input signal from a third sensor, wherein the third input signal concerns at least one of a position, orientation, and directional motion of at least one hand of the passenger within a hand sensing column region;
   adjusting, by the controller, at least one parameter associated with light generated by a first light source within a first light source column region based on the first input signal, the second input signal, and the third input signal; and
   directing the first light source column region towards the hand sensing column region.

16. The method of claim 15, further comprising:
   receiving a passenger input signal from a passenger input device associated with the seat, wherein the passenger input corresponds to the at least one parameter associated with the light; and
   adjusting, by the controller, the at least one parameter associated with the light based on the passenger input signal.

17. The method of claim 15, wherein the second sensor is adapted to sense a weight of the passenger in the seat.

18. The method of claim 15, wherein the first light source comprises at least one light emitting diode.

19. The method of claim 15, further comprising at least one of:
   receiving, by the controller, a fourth input signal from a fourth sensor associated with a window shade, wherein the fourth input signal concerns a degree of openness of the window shade;
   receiving, by the controller, a fifth input signal from a fifth sensor associated with a cabin light, wherein the fifth input signal concerns a parameter associated with the cabin light;
   receiving, by the controller, a sixth input signal from a sixth sensor associated with an ambient light, wherein the sixth input signal concerns a parameter associated with the ambient light; and
   receiving, by the controller, a seventh input signal from a seventh sensor associated with an air supply, wherein the seventh input signal concerns at least one of an air flow direction and an air flow rate associated with the air supply,
   wherein the controller further controls at least one parameter associated with comfort for the passenger based on at least one of the fourth input signal, the fifth input signal, the sixth input signal, and the seventh input signal.

20. An executable non-transitory computer program product embodying instructions for a method of operation of a passenger service system, wherein the instructions comprise steps to:
   receive, by the controller, a first input signal from a first sensor, wherein the first input signal concerns at least a position of a seat adapted to receive a passenger therein;
   receive, by the controller, a second input from a second sensor, wherein the second input signal concerns at least a presence of the passenger in the seat;
   receive, by the controller, a third input from a third sensor, wherein the third input signal concerns at least one of a position, orientation and direction of motion of at least one hand of the passenger within a hand sensing column region;
   adjust, by the controller, at least one parameter associated with light generated by a first light source within a first light source column region based on the first input signal, the second input signal, and the third input signal; and
   direct the first light source column region towards the hand sensing column region.

21. The executable non-transitory computer program product of claim 20, wherein the instructions further comprise steps to:
   receive a passenger input signal from a passenger input device associated with the seat, wherein the passenger input corresponds to the at least one parameter associated with the light; and
   adjust, by the controller, the at least one parameter associated with the light based on the passenger input signal.

22. The executable non-transitory computer program product of claim 20, wherein the instructions further comprise at least one step to:
   receive, by the controller, a fourth input signal from a fourth sensor associated with a window shade, wherein the fourth input signal concerns a degree of openness of the window shade;
   receive, by the controller, a fifth input signal from a fifth sensor associated with a cabin light, wherein the fifth input signal concerns a parameter associated with the cabin light;
   receive, by the controller, a sixth input signal from a sixth sensor associated with an ambient light, wherein the sixth input signal concerns a parameter associated with the ambient light; and
   receive, by the controller, a seventh input signal from a seventh sensor associated with an air supply, wherein the seventh input signal concerns at least one of an air flow direction and an air flow rate associated with the air supply.

23. The executable non-transitory computer program product of claim 22, wherein the instructions further comprise at least the step to:
   adjust, by the controller, at least one parameter associated with comfort for the passenger based on at least one of the fourth input signal, the fifth input signal, the sixth input signal, and the seventh input signal.

* * * * *